US009175814B2

(12) United States Patent
Shida et al.

(10) Patent No.: US 9,175,814 B2
(45) Date of Patent: Nov. 3, 2015

(54) LED LAMP AND LIGHTING DEVICE

(75) Inventors: Satoshi Shida, Osaka (JP); Kenji Takahashi, Osaka (JP); Mitsuko Shuto, Osaka (JP); Masahiro Miki, Osaka (JP); Hideo Nagai, Osaka (JP); Takaari Uemoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/237,178

(22) PCT Filed: Feb. 15, 2012

(86) PCT No.: PCT/JP2012/000990
§ 371 (c)(1),
(2), (4) Date: Feb. 5, 2014

(87) PCT Pub. No.: WO2013/024557
PCT Pub. Date: Feb. 21, 2013

(65) Prior Publication Data

US 2014/0153252 A1 Jun. 5, 2014

(30) Foreign Application Priority Data

Aug. 12, 2011 (JP) ................................ 2011-176818

(51) Int. Cl.
*F21V 29/00* (2015.01)
*B60Q 1/06* (2006.01)
(Continued)

(52) U.S. Cl.
CPC ................ *F21K 9/30* (2013.01); *F21K 9/1355* (2013.01); *F21V 17/101* (2013.01);
(Continued)

(58) Field of Classification Search
CPC ....... F21V 17/101; F21V 3/005; F21V 29/24; F21V 23/006; F21V 15/06; F21K 9/30
USPC ............ 362/294, 345, 373, 363, 264, 249.02
See application file for complete search history.

(56) References Cited

U.S. PATENT DOCUMENTS 8,541,805 B2 9/2013 Motoya et al.
2006/0227558 A1* 10/2006 Osawa et al. ................ 362/351
(Continued)

FOREIGN PATENT DOCUMENTS

CA 2732324 7/2011
CA 2732324 A1 * 7/2011
(Continued)

OTHER PUBLICATIONS

JP Office Action dated Jul. 10, 2012, along with English language translation.
(Continued)

*Primary Examiner* — Peggy Neils
*Assistant Examiner* — William N Harris
(74) *Attorney, Agent, or Firm* — Greenblum & Bernstein, P.L.C.

(57) ABSTRACT

An LED lamp has an envelope that includes a globe and a case, an interior space of the envelope being divided in two by a mount closing an opening of the globe, the lamp containing, in a globe side of the interior space, an LED and, in a case side of the interior space, a circuit unit for causing the LED to emit light. The LED is thermally connected to the mount, and the mount and the case are joined to the globe such that, during light emission, at least as much heat from the LED is propagated from the mount to the globe as from the mount to the case.

14 Claims, 12 Drawing Sheets

(51) Int. Cl.

| | |
|---|---|
| ***F21S 13/10*** | (2006.01) |
| ***F21V 3/00*** | (2015.01) |
| ***F21V 15/00*** | (2015.01) |
| ***F21S 4/00*** | (2006.01) |
| ***F21V 21/00*** | (2006.01) |
| ***F21K 99/00*** | (2010.01) |
| ***F21V 17/10*** | (2006.01) |
| ***F21V 29/506*** | (2015.01) |
| *F21V 3/02* | (2006.01) |
| *F21V 3/04* | (2006.01) |
| *F21V 13/02* | (2006.01) |
| *F21V 23/00* | (2015.01) |
| *F21Y 101/02* | (2006.01) |
| *F21V 7/00* | (2006.01) |
| *F21V 29/15* | (2015.01) |
| *F21V 29/85* | (2015.01) |

(52) U.S. Cl.

CPC ................ *F21V 29/506* (2015.01); *F21K 9/50* (2013.01); *F21V 3/02* (2013.01); *F21V 3/0418* (2013.01); *F21V 3/0436* (2013.01); *F21V 7/0016* (2013.01); *F21V 13/02* (2013.01); *F21V 23/002* (2013.01); *F21V 23/006* (2013.01); *F21V 29/15* (2015.01); *F21V 29/85* (2015.01); *F21Y 2101/02* (2013.01)

(56) References Cited

U.S. PATENT DOCUMENTS

| | | | | |
|---|---|---|---|---|
| 2010/0091487 | A1 | 4/2010 | Shin | |
| 2010/0225220 | A1 | 9/2010 | Tanaka et al. | |
| 2010/0237761 | A1 | 9/2010 | Osawa et al. | |
| 2010/0237779 | A1 | 9/2010 | Osawa et al. | |
| 2010/0244650 | A1 | 9/2010 | Osawa et al. | |
| 2010/0244694 | A1 | 9/2010 | Osawa et al. | |
| 2011/0068687 | A1 | 3/2011 | Takahasi et al. | |
| 2011/0074290 | A1 | 3/2011 | Sakai et al. | |
| 2011/0089831 | A1 | 4/2011 | Takahasi et al. | |
| 2011/0101861 | A1* | 5/2011 | Yoo | 315/35 |
| 2011/0273895 | A1* | 11/2011 | Uemoto et al. | 362/430 |
| 2011/0292653 | A1* | 12/2011 | Hofmann et al. | 362/235 |
| 2012/0002421 | A1 | 1/2012 | Takahasi et al. | |
| 2012/0044684 | A1 | 2/2012 | Takahasi et al. | |
| 2012/0256538 | A1 | 10/2012 | Takeuchi et al. | |
| 2012/0287632 | A1* | 11/2012 | Takahashi et al. | 362/235 |
| 2013/0201700 | A1 | 8/2013 | Tamura et al. | |
| 2013/0229794 | A1 | 9/2013 | Miki et al. | |

FOREIGN PATENT DOCUMENTS

| | | |
|---|---|---|
| DE | 202007008258 | 10/2007 |
| JP | 2004-025227 | 1/2004 |
| JP | 2006-313717 | 11/2006 |
| JP | 2007-188832 | 7/2007 |
| JP | 4612120 | 1/2011 |
| JP | 2011-070971 | 4/2011 |
| JP | 2011-090843 | 5/2011 |
| WO | 2009/051128 | 4/2009 |

OTHER PUBLICATIONS

JP Decision to Grant dated Oct. 9, 2012, along with English language translation.

U.S. Appl. No. 14/234,187 to Tsugihiro Matsuda et al., filed Jan. 22, 2014.

International Search Report in PCT/JP2012/000990, mailed on Mar. 19, 2012.

Search report from E.P.O., mail date is May 30, 2014.

* cited by examiner

LED LAMP AND LIGHTING DEVICE

TECHNICAL FIELD

The present invention relates to an LED lamp and a lighting device using a semiconductor light-emitting element, and in particular to technology for improving the thermal dissipation properties thereof.

BACKGROUND ART

In recent years, energy conservation concerns have led to a proposal for a bulb-shaped lamp as a replacement for an incandescent bulb, where an LED being a semiconductor light-emitting element serves as a light source (hereinafter termed an LED lamp).

The LED lamp typically has a plurality of LEDs mounted on a mounting substrate, has the mounting substrate mounted, in turn, on an end of a case having a base at the other end thereof, and has a circuit unit for causing the LEDs to emit light (i.e., for lighting) held within the case (see Patent Literature 1).

The LEDs produce heat while emitting light, and the electronic components making up the circuit unit include components that produce additional heat as well as components prone to thermal damage. In particular, given the long useful life of the LEDs, a long useful life is also desired for the circuits lighting the LEDs.

As such, a conventional LED lamp is provided with an oversized case made of a material with good thermal dissipation properties, in order to constrain temperature increases in the LEDs and in the electronic components, and to constrain the thermal load imposed on the case by the electronic components of the circuit unit. That is, the case serves as a heat sink (see Patent Literature 1).

However, having the case serve as a heat sink leads to increased temperatures in the case itself, which increases the thermal load imposed on the circuits contained therein.

In addition, a lamp has been proposed in which a further casing for the circuits is provided within the case for holding the circuits within the circuit unit without transmitting heat from the case to the circuits. When the case is made of metal, there is a further need to insulate the case from the circuits.

CITATION LIST

Patent Literature

[Patent Literature 1]
Japanese Patent Application Publication No. 2006-313717
[Patent Literature 2]
Japanese Patent No. 4612120

SUMMARY OF INVENTION

Technical Problem

As described above, an LED lamp configured with casing for the circuits inside the case has a larger quantity of components due to this additional casing, with accompanying additional weight. The larger quantity of components leads to increased material and assembly costs. Also, a lamp having increased weight may not be mountable in a lighting fixture intended for mounting a lightweight incandescent bulb.

In consideration of the above-described problem, the present disclosure aims to provide a lighting device and a lamp having a simple configuration and able to decrease the thermal load imposed on circuits while improving insulation.

Solution to Problem

In order to solve the problem, a lamp pertaining to the disclosure has an envelope that includes a globe and a case, an interior space of the envelope being divided in two by a mount closing an opening of the globe, the lamp containing, in a globe side of the interior space, a semiconductor light-emitting element and, in a case side of the interior space, a circuit unit for causing the semiconductor light-emitting element to emit light, wherein the semiconductor light-emitting element is thermally connected to the mount, and the mount and the case are joined to the globe such that, during light emission, at least as much heat from the semiconductor light-emitting element is propagated from the mount to the globe as from the mount to the case.

The lighting device pertaining to the disclosure includes a lighting fixture for lighting the lamp when mounted therein, and the lamp is configured as described above.

Advantageous Effects of Invention

The lamp and the lighting device pertaining to the present disclosure have the mount and the case joined to the globe such that at least as much of the heat produced when the semiconductor light-emitting element are producing light is propagated from the mount to the globe than from the mount to the case. As such, the thermal load imposed on the circuits of the circuit unit is decreased. In addition, the absence of the additional casing around the circuits provides a reduced quantity of components and a correspondingly lighter lamp.

Also, more of the heat is propagated from the mount to the globe than from the mount to the case when a contact surface area between the mount and the globe is greater than a contact surface area between the mount and the case, or else more of the heat is propagated from the mount to the globe than from the mount to the case when the globe is more thermo-conductive than the case.

Further, the mount may be fitted to the globe by insertion into the opening of the globe, the case may be fitted to an outside surface of an opening end of the globe, the opening of the globe may be circular, the mount may be a circular disc, and an outer circumferential surface of the mount and an inner circumferential surface of the opening end of the globe may be fixed by adhesive that is more thermo-conductive than the case. Here, the term disc refers to a plate in a certain shape (i.e., circular) that may or may not have a concavity or depression on a front face or on a reverse face thereof.

Alternatively, the case may be fixed to an outer circumferential surface of the opening end of the globe by adhesive that is less thermo-conductive than the case, and a heat shield plate may be disposed between the mount and the circuit unit.

DESCRIPTION OF EMBODIMENTS

An LED lamp pertaining to Embodiments of the present disclosure is described below, with reference to the accompanying drawings. The materials and dimensions described in the Embodiments are beneficial examples, and no limitation is intended thereby. Various adjustments are possible, provided that the technical intent of the disclosure is not exceeded thereby. Furthermore, the Embodiments may be freely combined, provided that no contradiction results therefrom. Also, the dimensions of materials suggested by the drawings may differ from actual measurements.

(Embodiment 1)

1. Overall Configuration

Figure 1:
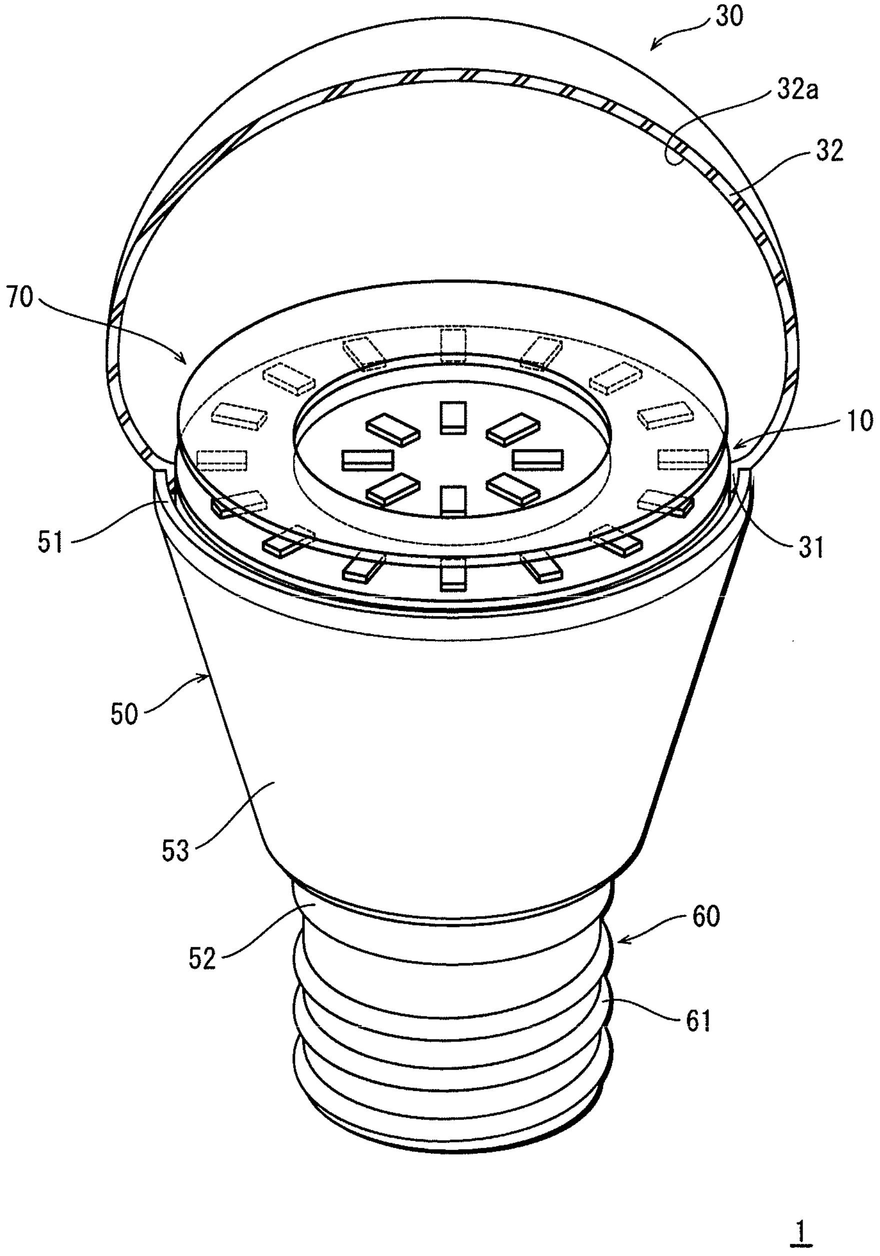
FIG. 1 is a partially-exploded perspective view of an LED lamp pertaining to Embodiment 1.
Figure 2:
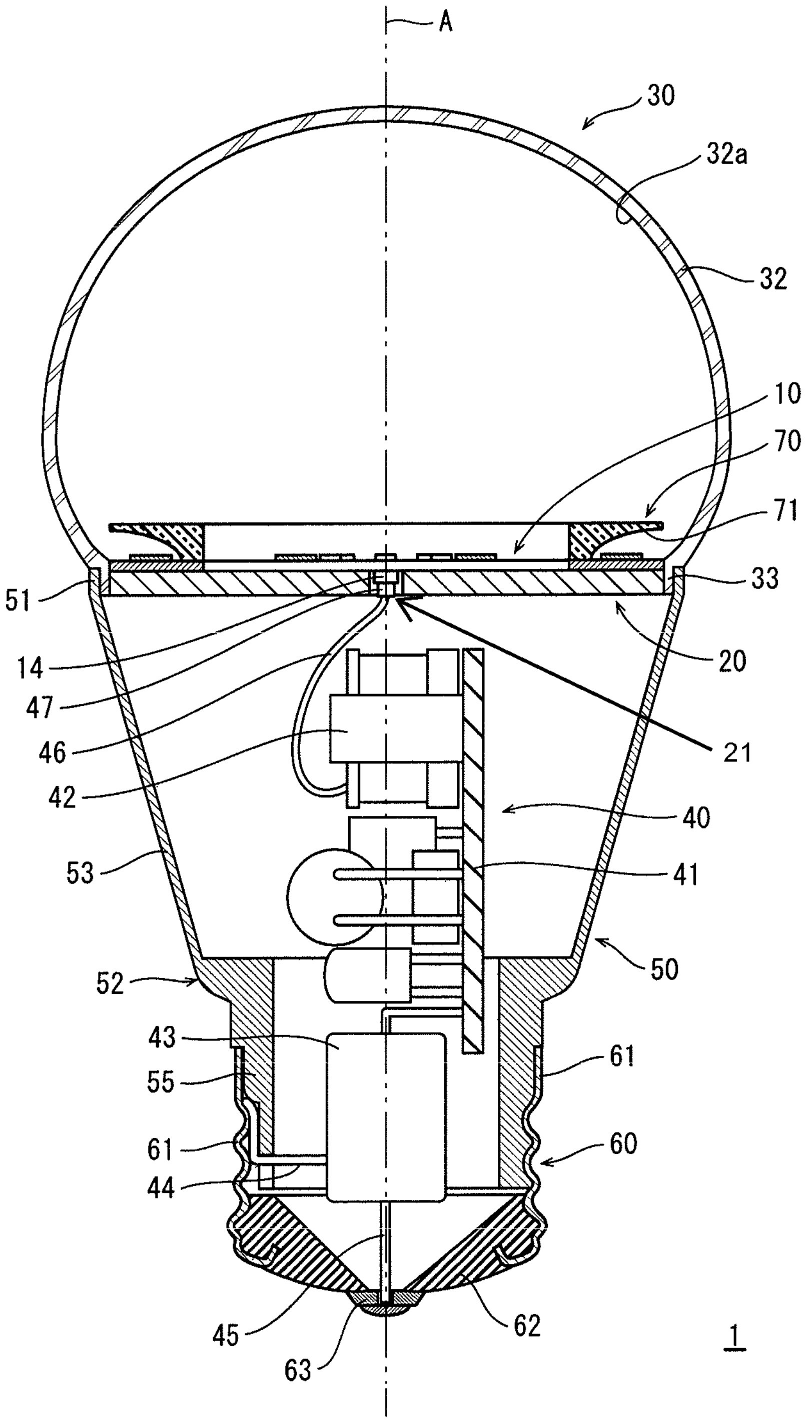
FIG. 2 is a cross-sectional view of the LED lamp pertaining to Embodiment 1.
Figure 3:
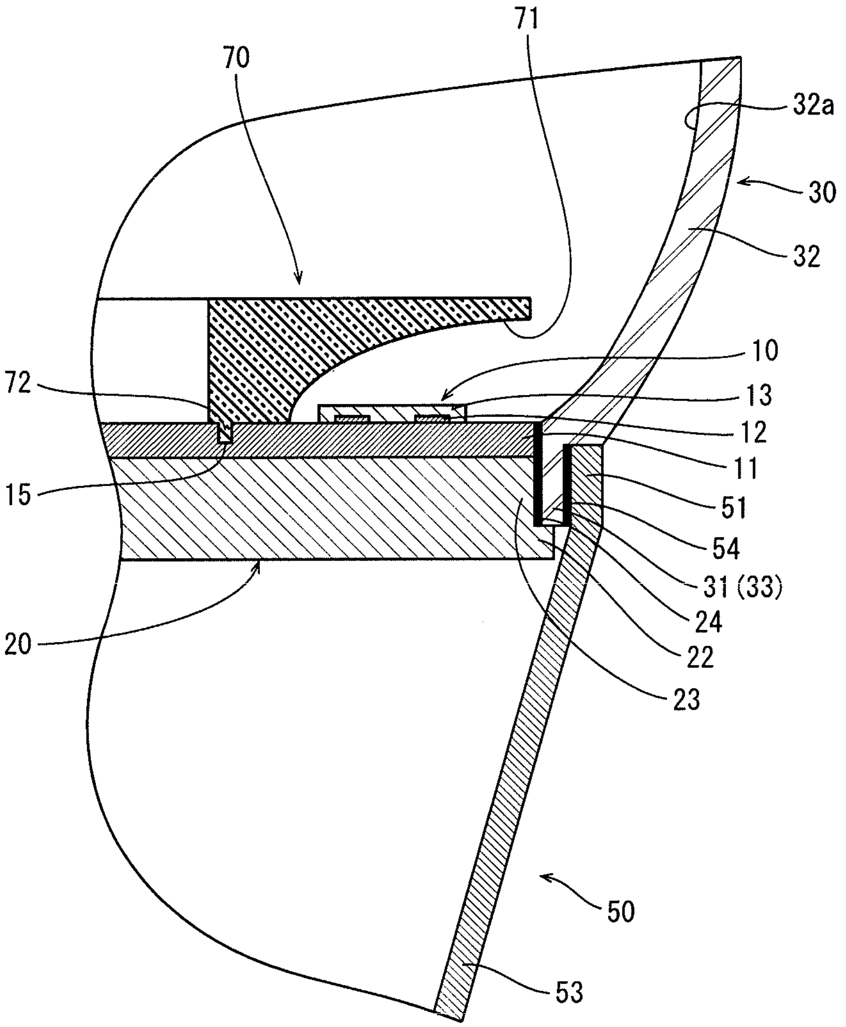
FIG. 3 is a magnified view of a portion of the LED lamp pertaining to Embodiment 1, where a globe, a mount, and a case are joined.

FIG. 1 is a partially-exploded perspective view of an LED lamp pertaining to Embodiment 1. FIG. 2 is a cross-sectional view of the LED lamp pertaining to Embodiment 1. FIG. 3 is a magnified view of a portion of the LED lamp pertaining to Embodiment 1, centring on the point of contact between the globe, the mount, and the case.

As shown in FIGS. 1-3, the LED lamp 1 pertaining to Embodiment 1 is intended as a replacement for an incandescent bulb. The following description applies to an example where the LED is used as the semiconductor light-emitting element.

The LED lamp 1 includes an LED module 10 made up of a plurality of LEDs acting as light sources, a mount 20 on which the LED module 10 is mounted, a globe 30 covering the LED module 10, a circuit unit 40 for lighting the LED module 10, a case 50 covering the circuit unit 40, a base 60 electrically connected to the circuit unit 40, and an optical scattering member 70 for scattering the main light produced by the LED module 10.

The double-chained line extending vertically along FIG. 2 represents a lamp axis A of the LED lamp 1. The lamp axis A is the centre of rotation of the LED lamp 1 when mounted in a socket of a (non-diagrammed) lighting fixture, and corresponds to the central rotational axis of the base 60. In FIG. 2, the top of the LED lamp 1 corresponds with the top of the page, and the bottom of the LED lamp 1 corresponds to the bottom of the page.

2. Component Configuration (1) LED Module

As shown in FIG. 3, the LED module 10 includes a mounting substrate 11, a plurality of LEDs 12 mounted on the mounting substrate 11, and a sealant 13 provided so as to cover and seal the LEDs 12 on the mounting substrate 11.

The mounting substrate 11 is a circular disc. The mounting substrate 11 is made of an insulating material. A (non-diagrammed) pattern is formed on the mounting substrate 11 for electrically connecting the LEDs 12 in a predetermined connection mode (e.g., in parallel or in series).

A reverse face of the mounting substrate 11 (i.e., facing the base 60, see FIG. 2) has a connector 14 for connecting the pattern to a lead line that is connected to the circuit unit 40 (see FIG. 2). The connector 14 is provided at the approximate centre of the reverse face of the mounting substrate 11.

As shown in FIG. 1, the LEDs 12 are mounted annularly on a front face of the mounting substrate 11, and are arranged such that a main direction of light emission is upward. Specifically, the LEDs 12 are closely arranged in pairs (each pair termed an LED group) along a radial direction of the mounting substrate 11 to form two concentric circles, as mounted.

The larger-diameter circle is made up of 16 pairs of LEDs, mounted at equal intervals with respect to the circumferential direction of the mounting substrate 11. The smaller-diameter circle is made up of 8 pairs of LEDs, also mounted at equal intervals with respect to the circumferential direction of the mounting substrate 11.

Each pair of LEDs 12, i.e., each LED group, is sealed as a unit by the sealant 13. The sealant 13 is illustrated in FIG. 1. The sealant 13 covers each pair of LEDs 12 making up an LED group, and is substantially rectangular. Needless to say, the larger-diameter circle includes a total of 16 units of the sealant 13, and the smaller-diameter circle includes a total of 8 units thereof.

The longitudinal direction of each unit of the sealant 13 corresponds to a radial direction of the mounting substrate 11, so as to appear to radiate from the lamp axis A when viewed from above along the lamp axis A.

The sealant 13 is principally made of an optically transmissive material. However, when there is a need to convert the light emitted by the LEDs 12 to a predetermined wavelength, the optically transmissive material may have a wavelength conversion material combined therewith.

The optically transmissive material is a silicone resin, for example. The wavelength conversion material is, for example, a type of fluorescent particle.

The present Embodiment uses LEDs 12 that emit blue light, and a sealant 13 made of an optically transmissive material combined with fluorescent particles that convert the blue light into yellow light. Thus, a portion of the blue light emitted by the LEDs 12 undergoes wavelength conversion by the sealant 13 into yellow light, and the combination of unconverted blue light with converted yellow light results in white light that is ultimately emitted from the LED module 10.

(2) Mount

The mount 20 is a member for mounting the LED module 10 and is a circular disc, as particularly shown in FIG. 2. The mount 20 has a through-hole 21 corresponding to the connector 14 of the mounting substrate 11. The LED module 10 is mounted so as to closely adhere to the front face of the mount 20. That is, the front face of the mount 20 and the reverse face of the mounting substrate 11 are in contact. Specifically, the mount 20 and the LED module 10 are fixed together by an adhesive having superb conductivity.

The mount 20 is, in turn, fitted on an opening end 31 of the globe 20, so as to close the opening of the globe 30. Specifically, as shown in FIG. 3, a side face (i.e., outer circumferential surface) of the mount 20 is in contact with an inner circumferential surface of the opening end 31 of the globe 30, and the two components are joined.

The outer circumferential surface of the mount 20 projects outward (i.e., forms a projection) across the entire circumference of a bottom side thereof. That is, the mount 20 has a small-diameter portion 23 and a large-diameter portion 22 (i.e., the projection).

The small-diameter portion 23 is inserted into the opening end 31 of the globe 30, such that the end of the opening end 31 of the globe 30 comes into contact with the large-diameter portion 22. While in this state, the outer circumferential surface of the small-diameter portion 23 and the inner circumferential surface of the opening end 31 of the globe 30 are connected by adhesive 24.

Here, adhesive 24 employs a material having high thermal conductivity in order to propagate heat generated when the LED module 10 is producing light (i.e., is lit) from the mount 20 to the globe 30. Specifically, the material employed is a resin combined with metal filler or similar highly thermoconductive material.

The globe 30 is fitted onto the case 50 while connected to the mount 20, such that the mount 20 is orthogonal to the lamp axis A of the LED lamp 1.

The mount 20 is, for example, made of a metal material. The metal material is, for example, Al, Ag, Au, Ni, Rh, or Pd, or an alloy of two or more of the listed metals, or an alloy of Cu and Ag. Such a metal material has beneficial thermal conductivity and is thus able to effectively propagate the heat produced by the LED module 10 to the globe 30.

(3) Globe

The globe 30 is an optically transmissive case enveloping the LED module 10. In the present Embodiment, the globe 30 is shaped similarly to a part of a glass bulb, in order to imitate the shape of an A-type incandescent glass bulb. The globe 30 includes a hemispherical portion 32 and a flange 33 that projects downward from a bottom end of the hemispherical portion 32.

The flange 33 corresponds to the above-described opening end 31. The inner circumferential surface of the flange 33 is connected to the outer circumferential surface of the small-diameter portion 23 of the mount 20 via adhesive 24, as previously described.

The globe 30 is formed of an optically transmissive material. This optically transmissive material is, for example, glass.

In this Embodiment, the globe 30 is beneficially shaped so as to have an outer appearance that is substantially spherical, thereby approaching a light distribution curve in which the light from the LED module 10 is distributed evenly.

A scattering process, e.g., with silicon dioxide or white pigment, is applied to an inner face 32*a* of the hemispherical portion 32 of the globe 30 so as to scatter the light produced by the LED module 10.

(4) Circuit Unit

The circuit unit 40 serves to cause the LEDs 12 to produce light (i.e., to light the LEDs). The circuit unit 40 includes a circuit substrate 41 and various electronic components 42 and 43 mounted on the circuit substrate 41. The circuit unit 40 includes a plurality of electronic components, but only a subset thereof are illustrated and referenced in FIG. 2.

The circuit unit 40 is fitted by inserting the circuit substrate 41 into a groove provided in the inner face of the case 50. The groove extends parallel to the lamp axis A and is indented with respect to the thickness dimension of the case 50. The width of the groove corresponds to the thickness of the circuit substrate 41.

Here, the circuit substrate 41 is solidly fitted (i.e., fixed) by applying adhesive to the groove. However other fitting (i.e., fixing) methods are also applicable. These other methods include fastening with screws, using an engaging configuration, and combinations of these and adhesive-using methods.

The circuit substrate 41 is disposed with an orientation such that a principal surface thereof is parallel to the lamp axis A. The circuit substrate 41 is in contact with the case 50 but not with the mount 20. Accordingly, the heat produced by the lit (i.e., light-producing) LED module 10 is not directly propagated to the circuit unit 40.

The circuit unit 40 and the base 60 are electrically connected by electronic wiring 44 and 45. Electronic wiring 44 is connected to a later-described shell portion 61 of the base 60, and electronic wiring 45 is connected to an eyelet 63 of the base 60.

The circuit unit 40 and the LED module 10 are electrically connected by electronic wiring 46. An end of electronic wiring 46 on the LED module 10 side is provided with a terminal 47 that connects to the connector 14 of the mounting substrate 11.

(5) Case

An outer envelope is formed by the case 50 in combination with the globe 30. The case 50 is fitted with the globe 30, forming a shape similar to that of an incandescent glass bulb. Specifically, the case 50 is cylindrical, with a diameter that is widest at the globe 30 and narrows (i.e., decreases in diameter) as it approaches the base 60.

A top end 51 of the case 50 serves as a globe joining portion, joining the case 50 to the globe 30. A bottom portion 52 of the case 50 serves a base fitting portion for fitting the base 60. Here, the globe joining portion is tubular with a substantially constant diameter. The base fitting portion is also tubular with a substantially constant diameter. A decreasing diameter portion 53 is located between the top end 51 and the bottom portion 52 of the case 50, being widest at the top end 51 and gradually decreasing in diameter as it approaches the base 60.

As shown in FIG. 3, the top end 51 is joined with the globe 30 through adhesive 54 such that the flange 33 of the globe 30 is externally fitted. That is, the inner circumferential surface of the top end 51 and the outer circumferential surface of the flange 33 of the globe 30 are joined by adhesive 54. In the present Embodiment, the case 50 and the mount 20 are not in contact.

The positioning of the globe 30 and the case 50 is achieved by bringing a top end face of the case 50 into contact with a gradation formed between the hemispherical portion 32 and the flange 33 of the globe 30.

The bottom portion 52 has a screw portion 55 at a lower side thereof for screwing into the base 60. The interior of the bottom portion 52 has a subset of the electronic components 43 of the circuit unit 40 arranged therein.

A fixing groove is formed in the screw portion 55 so as to be parallel to the lamp axis A, and serves to fix the electronic wiring 44 of the circuit unit 40.

The case 50 is made of a resin material. Specifically, the material is polybutylene terephthalate (hereinafter, PBT), epoxy resin, or similar.

(6) Base

The base 60 is a member receiving electric power from a socket of a lighting fixture when the LED lamp 1 is attached to the lighting fixture and lit. No particular limitation is intended regarding the type of base 60. In the present Embodiment, an E26-type Edison screw is used.

The base 60 includes the shell portion 61, which is substantially cylindrical with an outer circumferential surface that is formed as a male screw, and the eyelet 63 that is fitted to the shell portion 61 via an insulating portion 62.

(7) Optical Scattering Member

The optical scattering member 70 serves to scatter the light emitted by the LED module 10. As shown in FIGS. 2 and 3, the optical scattering member 70 of the present Embodiment is substantially cylindrical. In terms of outer diameter, the optical scattering member 70 has a lower end portion that is narrowest at the bottom and gradually increases in diameter with increasing proximity to the top. The expanded part of the lower end portion has an outer face that serves as a reflective surface 71 of the optical scattering member 70. Conversely, the outer diameter of the upper end portion, i.e., the outer circumferential surface, is constant. Also, the inner diameter of the optical scattering member 70 is constant with respect to the vertical direction. When viewed from the bottom along the lamp axis A, the reflective surface 71 is annular.

As shown in FIG. 2, the optical scattering member 70 is disposed such that the cylinder axis has an orientation orthogonal to the top face of the mount 20. The optical scattering member 70 is disposed within the two concentric circles of LEDs on the top face of the mounting substrate 11 such that the reflective surface 71 is positioned over the outermost ring of LEDs.

The optical scattering member 70 is disposed within the two concentric circles of LEDs on top of the mounting substrate 11 at a position such that the innermost ring of LEDs is surrounded by an inner circumferential surface of the optical scattering member 70.

As shown in FIG. 3, the optical scattering member 70 is affixed to the mounting substrate 11 of the LED module 10. The mounting substrate 11 has a concavity 15 formed therein for positioning the optical scattering member 70 within the two concentric rings of LEDs between the outermost ring and the innermost ring. The optical scattering member 70 and the LED module 10 are mutually positioned by fitting a protrusion 72 of the optical scattering member 70 into the concavity 15.

The optical scattering member 70 and the LED module 10 are joined using an adhesive, for example.

The optical scattering member 70 is made of an optically transmissive material having optically transmissive scattering particles dispersed therein. Accordingly, a portion of the light emitted by the LED module 10 is reflected backward by the reflective surface 71 while another portion of the light passes through the optical scattering member 70 and proceeds forward.

The optically transmissive material used in the optical scattering member 70 is, for example, a resin material such as polycarbonate, glass, ceramic, or similar material. The optically transmissive scattering particles are, for example, titanium dioxide, silicone dioxide, aluminium oxide, zinc oxide, or similar. Also, the mirror treatment applied to the reflective surface 71 is, for example, a process of forming a reflective film that is a metal film or a dielectric multilayer by using, for instance, thermal evaporative deposition, electron beam evaporation deposition, sputtering, plating, or similar methods.

3. Thermal Dispersion Paths

The LED lamp 1 pertaining to the present Embodiment uses a plurality of paths for dispersing the heat produced when emitting light. The heat produced when emitting light includes heat produced by the LEDs 12 and heat produced by the circuit unit 40.

(1) Heat Produced by LEDs

The LED lamp 1 pertaining to the present Embodiment has the mount 20 and the globe 30 joined by adhesive 24 having high thermal conductivity. In contrast, the globe 30 and the case 50 joined by adhesive 54 having low thermal conductivity. That is, more heat is propagated between the mount 20 and the globe 30 than between the mount 20 and the case 50.

Accordingly, most of the heat emitted by the LEDs 12 is propagated from the mounting substrate 11 of the LED module 10 through the mount 20 to the globe 30, and is then dissipated to the atmosphere (i.e., into the air) by the globe 30.

A portion of the heat propagated to the globe 30 is further propagated to the case 50 and dissipated to the atmosphere by the case 50, or is propagated to the socket of the lighting fixture via the base 60. Here, less heat is propagated to the case 50 in comparison to a conventional situation where heat is directly propagated from the mount to the case. As such, the temperature of the case 50 is not excessively raised (i.e., raised to a temperature that damages the circuits in the circuit unit).

This configuration and thermal propagation scheme differs from a conventional configuration where the case is used as a heat sink (e.g., Japanese Patent Application Publication No. 2006-313717) and from a conventional thermal propagation scheme where heat escapes from the base to the lighting fixture (e.g., Japanese Patent No. 4136485 and Japanese Patent Application Publication No. 2006-313717).

(2) Heat Produced by Circuit Unit

The heat produced by the circuit unit 40 is propagated to the case 50 through transfer, convective flow, and radiation. A portion of the heat propagated to the case 50 is dissipated to the atmosphere thereby, or is propagated to the socket of the lighting fixture via the base 60. As such, less heat is accumulated in the case 50, such that the temperature of the case 50 is not excessively raised (i.e., raised to a temperature that damages the circuits). The case may be filled with highly thermo-conductive resin in order to improve the thermal propagation from the circuit unit to the case.

(Embodiment 2)

In Embodiment 1, the outer circumferential surface of the opening end 31 of the globe 30 and the inner circumferential surface of the top end 51 of the case 50 are joined via adhesive 54.

Embodiment 2 describes an LED lamp 100 in which a member other than adhesive is used between the globe and the case.

Figure 4:
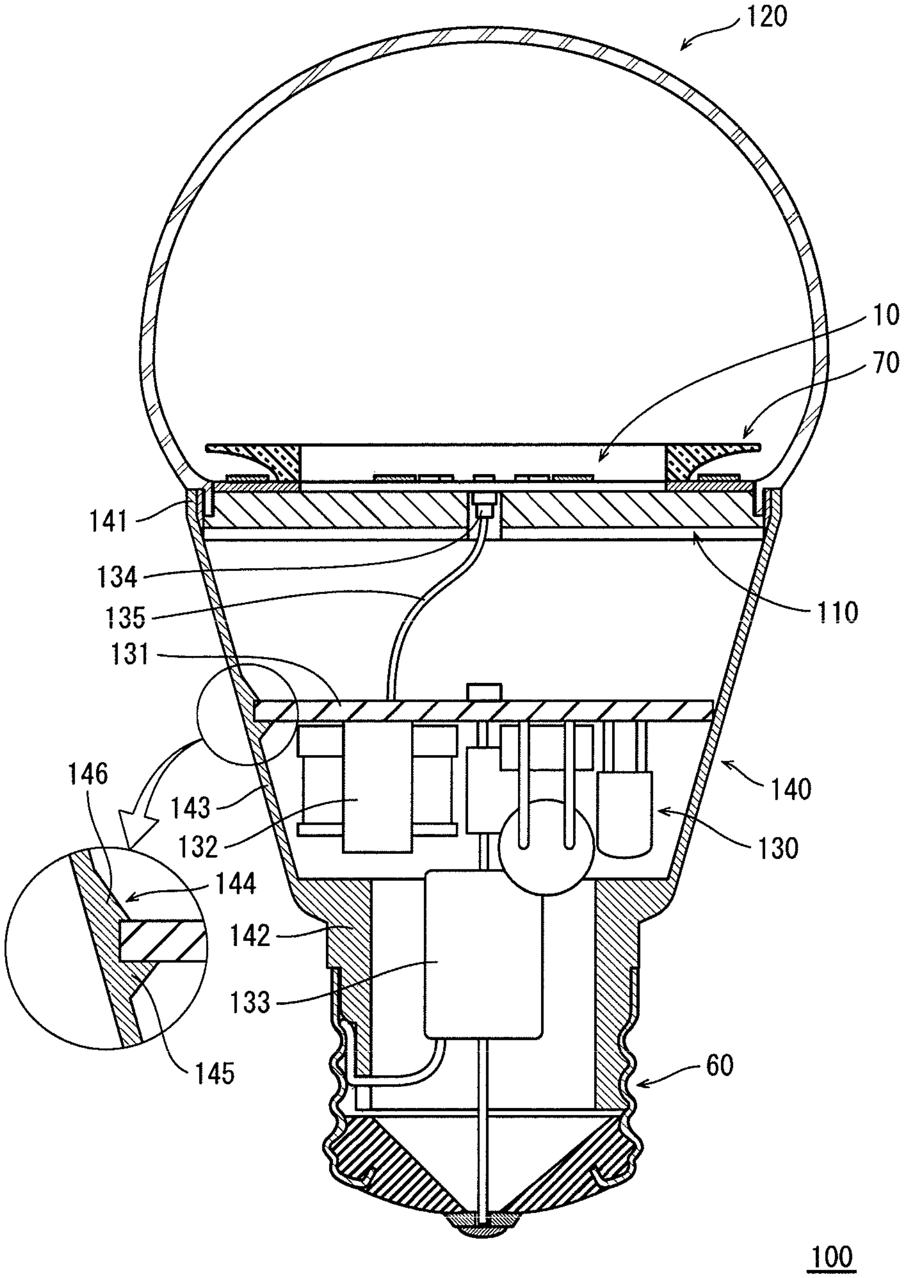
FIG. 4 is a cross-sectional view of an LED lamp pertaining to Embodiment 2.
Figure 5:
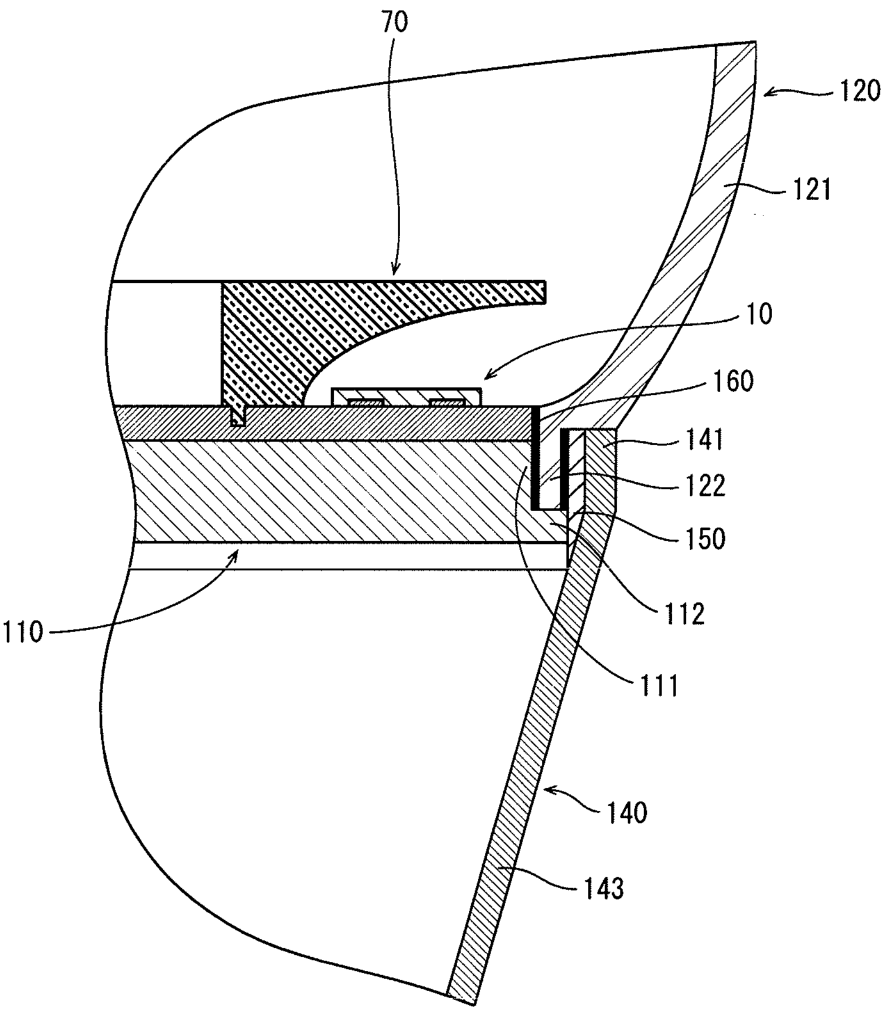
FIG. 5 is a magnified view of a portion of the LED lamp pertaining to Embodiment 2, where a globe, a mount, and a case are joined.

FIG. 4 is a cross-sectional view of the LED lamp pertaining to Embodiment 2. FIG. 5 is a magnified view of a portion of the LED lamp pertaining to Embodiment 2, centring on the point of contact between the globe, the mount, and the case.

The LED lamp 100 includes an LED module 10, a mount 110, a globe 120, a circuit unit 130, a case 140, a base 60, and an optical scattering member 70. Components using the same reference numbers as Embodiment 1 are configured similarly to the components described in Embodiment 1.

The mounting substrate 110 is a circular disc. The mounting substrate 110 has a gradation at the outer circumferential surface thereof. A top part of the circumferential surface of the mount 110 (i.e., the front face, facing the LED module 10) forms a small-diameter portion 111 while a bottom part of the circumferential surface of the mount 110 (i.e., the reverse face, facing the base 60) forms a large-diameter portion 112. The LED module 110 is mounted on the front face of the mount 110. The joining of the mount 110 and the globe 120 is described later.

The globe 120 is configured similarly to Embodiment 1, being shaped to resemble a portion of an incandescent glass bulb. The globe 120 has a hemispherical portion 121 and a flange 122. The flange 122 extends from the bottom end of the hemispherical portion 121 in parallel to the lamp axis A. The flange 122 is cylindrical. The joining of the globe 120 and the mount 110 is described later.

The circuit unit 130 has a circuit configuration similar to that of Embodiment 1, but differs in terms of the orientation of the circuit substrate 131.

The circuit unit 130 has a circuit substrate 131 and a plurality of electronic components 132 and 133. Although the electronic components are provided in plurality, only two of the electronic components are illustrated and labelled for the sake of clarity in the drawings.

The circuit substrate 131 has the electronic components 132 and 133 mounted on a reverse side (i.e., the face closest to the base 60) thereof. The circuit unit 130 and the LED module 10 are electrically connected by electronic wiring 135 having a terminal 134.

A principal surface of the circuit substrate 131 (either one of the front face or the reverse face) is mounted on the case 140 while oriented so as to be orthogonal to the lamp axis A. The mounting of the circuit substrate 131 on the case 140 is described later.

The case 140 has an outer appearance identical to that of the case 50 of Embodiment 1. A top end 141 of the case 140 serves as a globe joining portion, joining the case 50 to the globe 120. A bottom portion 142 of the case 140 serves a base fitting portion for fitting the base 60. A decreasing diameter portion 143 is located between the top end 141 and the bottom portion 142 of the case 140, being widest at the top end 141 and gradually decreasing in diameter as it approaches the bottom. The top end 141, the bottom portion 142, and the decreasing diameter portion 143 are respectively configured similarly to the top end 51, the bottom portion 52, and the decreasing diameter portion 53 of Embodiment 1.

The case 140 is equipped with a fixing means for fixing within the circuit unit 130. An interlocking configuration serves as the fixing means. An interlocking part 144, acting as the fixing means, is provided in plurality along the circumferential direction of the case 140. Here, four such interlocking parts 144 are provided, at equal intervals with respect to the circumferential direction. The interlocking part 144 includes a support portion 145 on the base 60 side supporting the circuit substrate 131, and an engaging portion 146 engaging with a globe 120 side surface of the circuit substrate 131.

That is, the front face of the circuit substrate 131 supported by the support portion 145 (i.e., the face that faces the globe) engages with the engaging portion 146, such that the circuit substrate 131 is interlocked with the case 140.

As shown in FIG. 5, a cylindrical member 150 is disposed inside the top end 141 of the case 140. The cylindrical member 150 is provided alongside the top end 141 of the case 140. Here, the cylindrical member 150 is mounted in the case 140 through pressurizing by the case 140. The cylindrical member 150 is made of a material that is less thermo-conductive than the mount 110. The cylindrical member may be fixed to the case by adhesive, by an interlocking method, by screw attachment, or by some other method.

The mount 110 is mounted on the cylindrical member 150 that is fixed to the case 140. Specifically, the outer circumferential surface of the large-diameter portion 112 of the mount 110 is in contact with the inner circumferential surface of the cylindrical member 150, and a groove is formed between the outer circumferential surface of the small-diameter portion 111 and the inner circumferential surface of the cylindrical member 150.

The flange 122 of the globe 120 is inserted into this groove, and adhesive 160 joins the globe 120, the mount 110, and the cylindrical member 150. Here, adhesive 160 has thermo-conductive properties in order to constrain the thermal propagation from the mount 110 to the case 140 having the cylindrical member 150 provided therebetween.

In Embodiment 2, the heat produced by the LED module 10 when the LED lamp 100 is lit is propagated via the mount 110 to the flange 122 of the globe 120. The cylindrical member 150 having poor thermo-conductivity is present between the flange 122 and the case 140, thus making heat less likely to be propagated from the flange 122 to the case 140 and constraining the propagation of heat to the case 140.

Accordingly, the heat produced by the LED module 10 is unlikely to be propagated from the mount 110 to the case 140, and is instead propagated through the mount 110 and the globe 120 to be scattered and dissipated in the globe 120, thus preventing an overly-large heat load from being imposed on the circuit unit 130.

(Embodiment 3)

In Embodiments 1 and 2, the heat from the LED module is propagated to the mount, and further heat radiation from the mount to the circuit unit was not prevented by any prevention means. Embodiment 3 describes an LED lamp 200 having such a prevention means.

Figure 6:
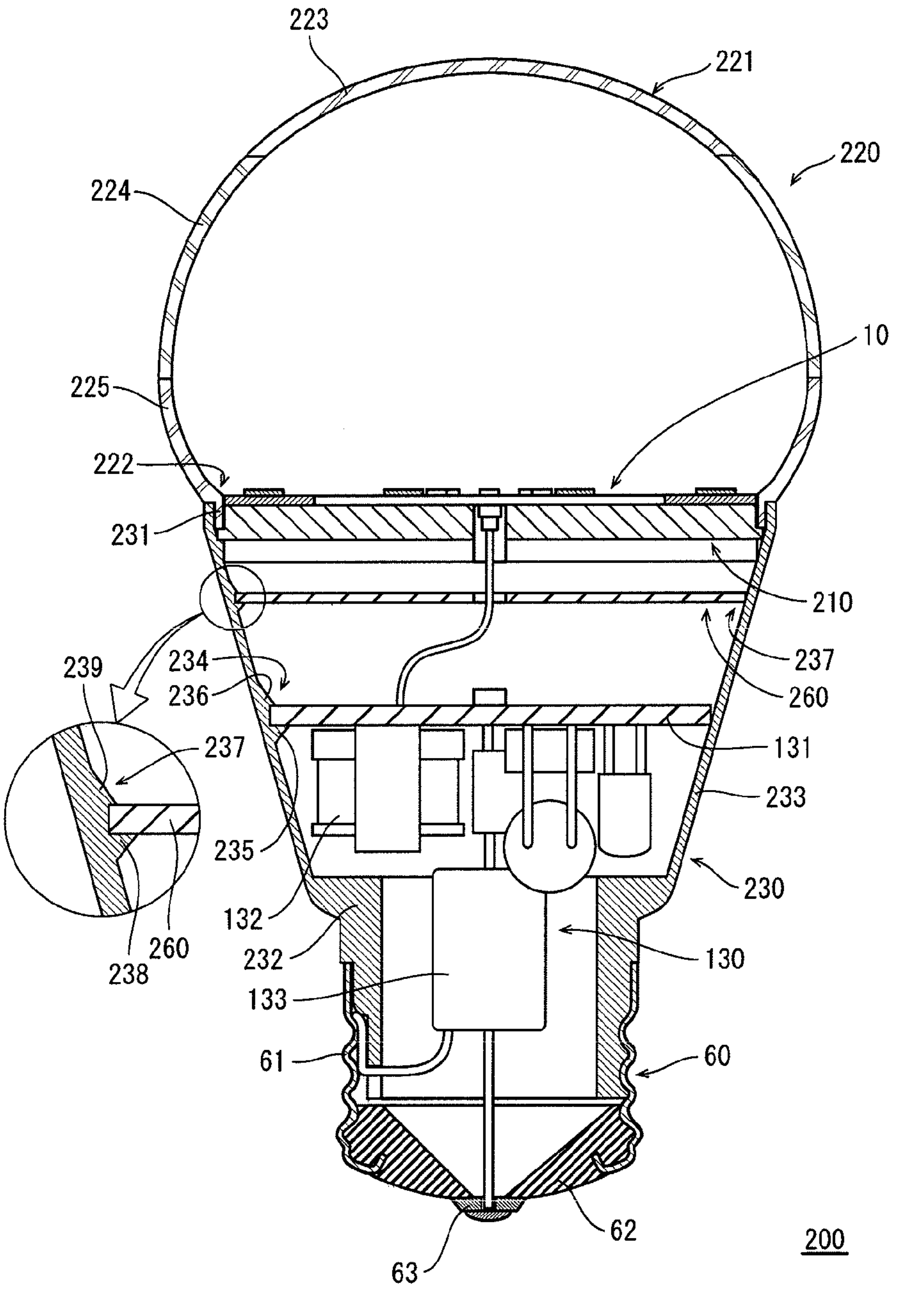
FIG. 6 is a cross-sectional view of an LED lamp pertaining to Embodiment 3.
Figure 7:
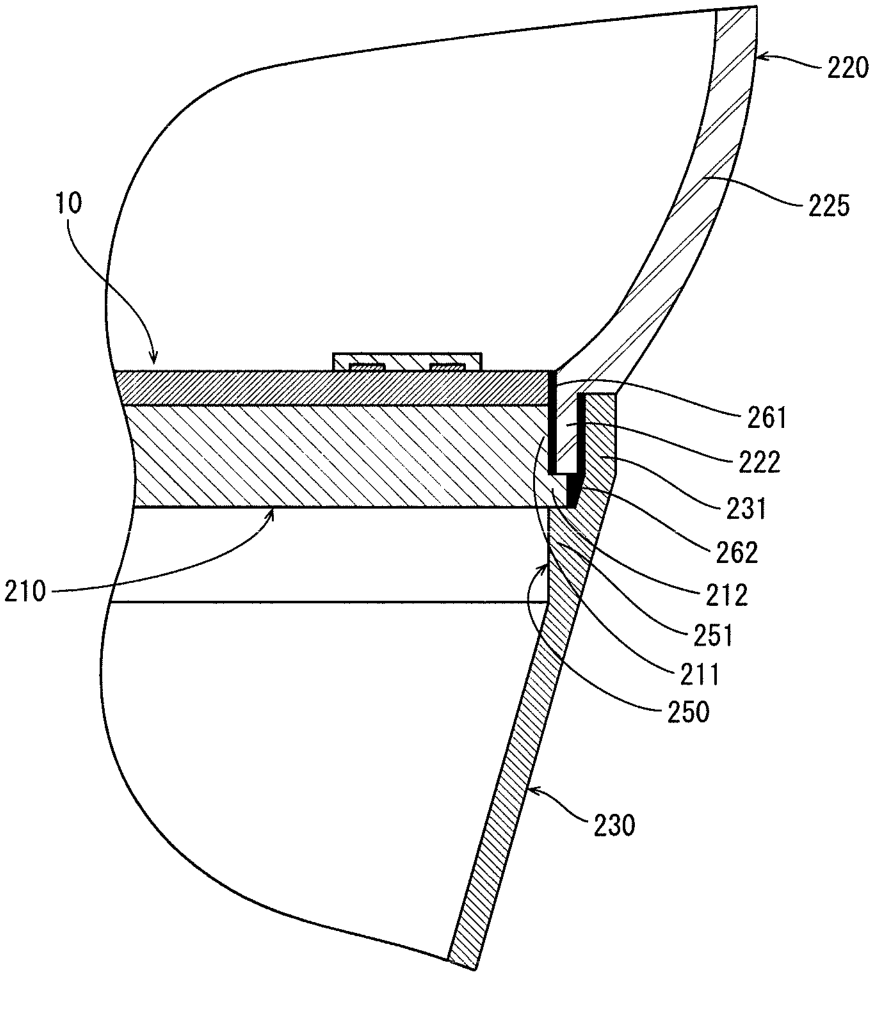
FIG. 7 is a magnified view of a portion of the LED lamp pertaining to Embodiment 3, where a globe, a mount, and a case are joined.

FIG. 6 is a cross-sectional view of the LED lamp pertaining to Embodiment 3. FIG. 7 is a magnified view of a portion of the LED lamp pertaining to Embodiment 3, centring on the point of contact between the globe, the mount, and the case.

The LED lamp 200 includes an LED module 10, a mount 210, a globe 220, a circuit unit 130, a case 230, a base 60, and a heat shield plate 260. Components using the same reference numbers as Embodiment 1 and Embodiment 2 are configured similarly to the components described in Embodiment 1 and Embodiment 2.

The mounting substrate 210 is a circular disc. As shown in FIG. 7, the mount 210 has a gradation at the outer circumferential surface thereof. A top part of the outer circumferential surface of the mount 210 (i.e., the front face, facing the LED module 10) forms a small-diameter portion 211 while a bottom part of the outer circumferential surface of the mount 110 (i.e., the reverse face, facing the base 60) forms a large-diameter portion 212, The LED module 210 is mounted on the front face of the mount 110. The joining of the mount 210 and the globe 220 is described later.

The globe 220 is configured similarly to Embodiments 1 and 2, being shaped to resemble a portion of an incandescent glass bulb. The globe 220 has a hemispherical portion 221 and a flange 222, similar to the globe 120 of Embodiment 2. The joining of the globe 220 and the mount 210 is described later.

The globe 220 is made of a resin material and includes three globe members 223, 224, and 225. Each of the globe members 223, 224, and 225 is joined by a resin material (i.e., an adhesive) being the same resin material that principally forms the globe members themselves.

Globe member 223 is positioned at the apex of the globe 220, globe member 225 is positioned at the flange 222, and globe member 224 is positioned between globe members 223 and 225.

The globe members 223, 224, and 225 have optically transmissive scattering particles dispersed throughout the resin material. The optically transmissive scattering particles are present in different proportions for each globe member 223, 224, and 225.

Specifically, the LED module 10 uses LEDs that produce light having strong directionality. As such, the optically transmissive scattering particles are present in a greater proportion within globe members 223 and 224, which are positioned toward the top of the LED module 10.

That is, the optically transmissive scattering particles are dispersed throughout globe member 225, globe member 224, and globe member 223 in increasingly high proportion. Thus, the light produced by the LED module 10 is scattered. Therefore, the light is emitted across a wide range to the front, sides, and rear of the LED lamp 200.

The circuit unit 130 has a circuit substrate 131 and a plurality of electronic components 132 and 133, much like the circuit unit of Embodiment 1. Although the electronic components are provided in plurality, only two of the electronic components are illustrated and labelled for the sake of clarity in the drawings.

The electrical connection of the circuit unit 130 and the base 60, as well as the electrical connection of the circuit unit 130 and the LED module 10, are identical to Embodiment 2. The mounting of the circuit unit 130 on the case 230 is described later, and is also similar to Embodiment 2.

The case 230 has an outer appearance identical to those of the case 50 of Embodiment 1 and the case 140 of Embodiment 2. A top end 231 of the case 230 serves as a globe joining portion. A bottom portion 232 of the case 230 serves a base fitting portion. A decreasing diameter portion 233 is formed between the top end 231 and the bottom 232 of the case 230.

The case 230 has a fixing means for fixing within the circuit unit 130, much like the case 140 of Embodiment 2. The fixing means is an interlocking part 234 employing an interlocking structure. The interlocking part 234 is formed in plurality at equal intervals along the circumferential direction. The interlocking part 234 has a support portion 235 and an engaging portion 236.

The case 230 has a fixing means for fixing the aforementioned heat shield plate 260. The fixing means for the heat shield plate 260 is, for example, similar to the interlocking part 237 using the interlocking structure in the case 140 of Embodiment 2. The interlocking part 237 is formed in plurality at equal intervals along the circumferential direction. The interlocking part 237 has a support portion 238 and an engaging portion 239.

As shown in FIG. 7, a support 250 inside the top end 231 of the case 230 supports the mount 210 from below. The support 250 is formed along the inner circumferential surface of the case 230 and extends to the mount 210 from a protruding portion 251 that protrudes toward the central axis of the case 230. Accordingly, the mount 210 and the case 230 are easily positioned.

The mount 210 is joined to the inner circumference of the flange 222 on the globe 220. Specifically, the small-diameter portion 211 of the mount 210 is inserted into the flange 222 of the globe 220 and the two components are fixed by adhesive 261 that is more thermo-conductive than the case 230.

The case 230 is joined to the outer circumference of the flange 222 in the globe 220. Specifically, the flange 222 of the globe 220 is inserted into the top end 231 of the case 230 and fixed using adhesive 262 that is less thermo-conductive than the case 230.

The heat shield plate 260 is positioned between the mount 210 and the circuit unit 130 and serves to protect the circuit unit 130 against heat radiating from the LED module 10, which is mounted on the mount 210. No particular limitation is intended regarding the material used for the heat shield plate 260. Any material that is less thermo-conductive than copper may be used, such as a metal material including iron, nickel, titanium, or an alloy such as stainless steel.

In Embodiment 3, the heat produced by the LED module 10 when the LED lamp 200 is lit is propagated to the mount 210. The mount 210 and the globe 220 are joined by adhesive 261 that is more thermo-conductive than the case 230, while the globe 220 and the case 230 are joined by adhesive 262 that is less thermo-conductive than the case 230. Thus, the heat from the mount 210 is propagated to the flange 222 of the globe 220 without spreading toward the case 230, and is then dissipated to the atmosphere over the entirety of the globe 220.

Also, the mount 210 and the case 230 are in contact via the large-diameter portion 212 of the mount 210 and the support 250 of the case 230, such that the heat from the mount 210 is propagated by the case 230 through this contact. However, the base 60 is fitted on the case 240 and thus, heat is also able to dissipate through the case 240 and the base 60. Furthermore, the heat shield plate 260 is fitted at the top of the case 240. Accordingly, the heat transmitted to the mount 210 is not directly radiated to the circuit unit 130 but is mostly prevented from increasing the thermal load on the circuit unit 130.

In addition, the heat propagated from the mount 210 to the case 240 is in turn propagated (i.e., transferred) toward the base 60 and, in passing, toward the heat shield plate 260, such that the heat of the case 240 is dispersed. Accordingly, an excessive thermal load on the circuit unit 130 is prevented.

Configuring the case 230 from a less thermo-conductive material enables a reduction to the amount of heat propagated to the case 230 from the mount 210, thereby diminishing the thermal load on the circuit unit 130.

(Embodiment 4)

In Embodiments 1 through 3, the LED module is disposed near the opening end of the globe. However, the LED module need not necessarily be positioned near the opening of the globe.

Embodiment 4 describes a lamp 301 in which the LED module is arranged at the approximate centre of the globe.

Figure 8:
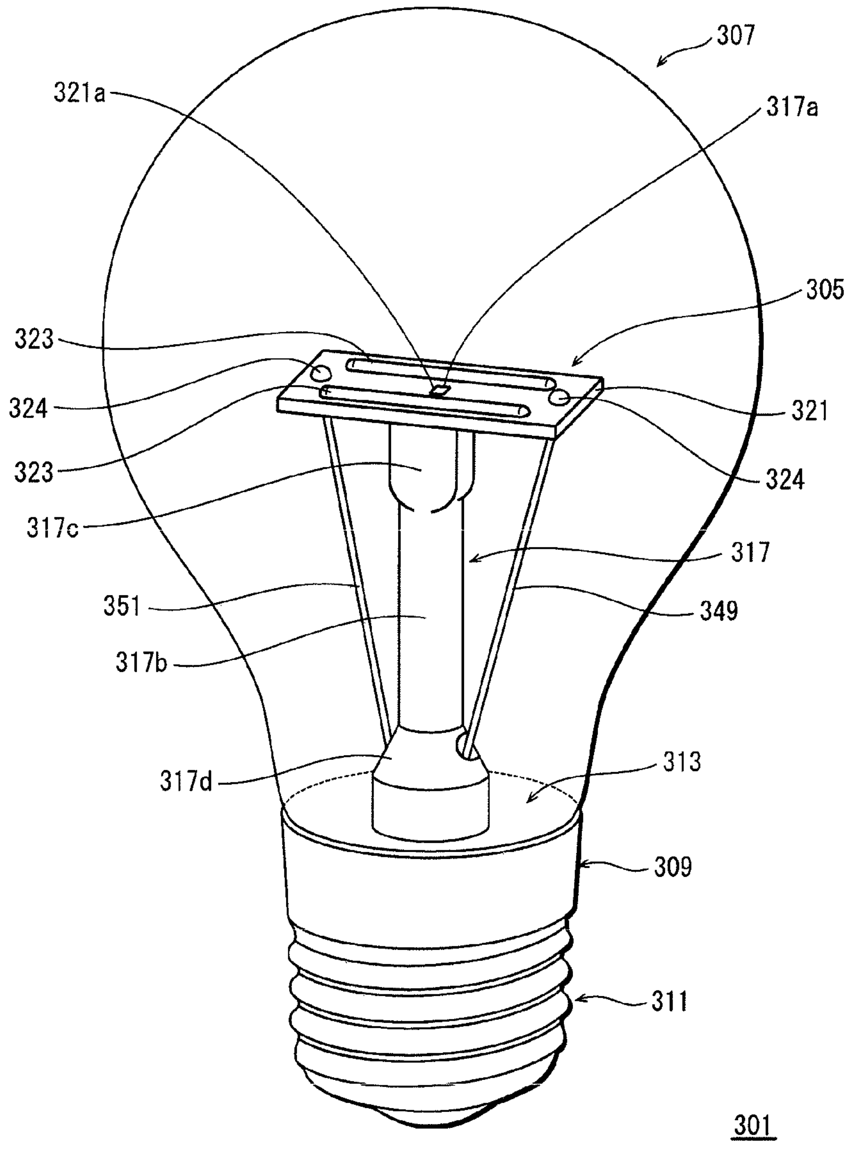
FIG. 8 is a perspective view of an LED lamp pertaining to Embodiment 4.
Figure 9:
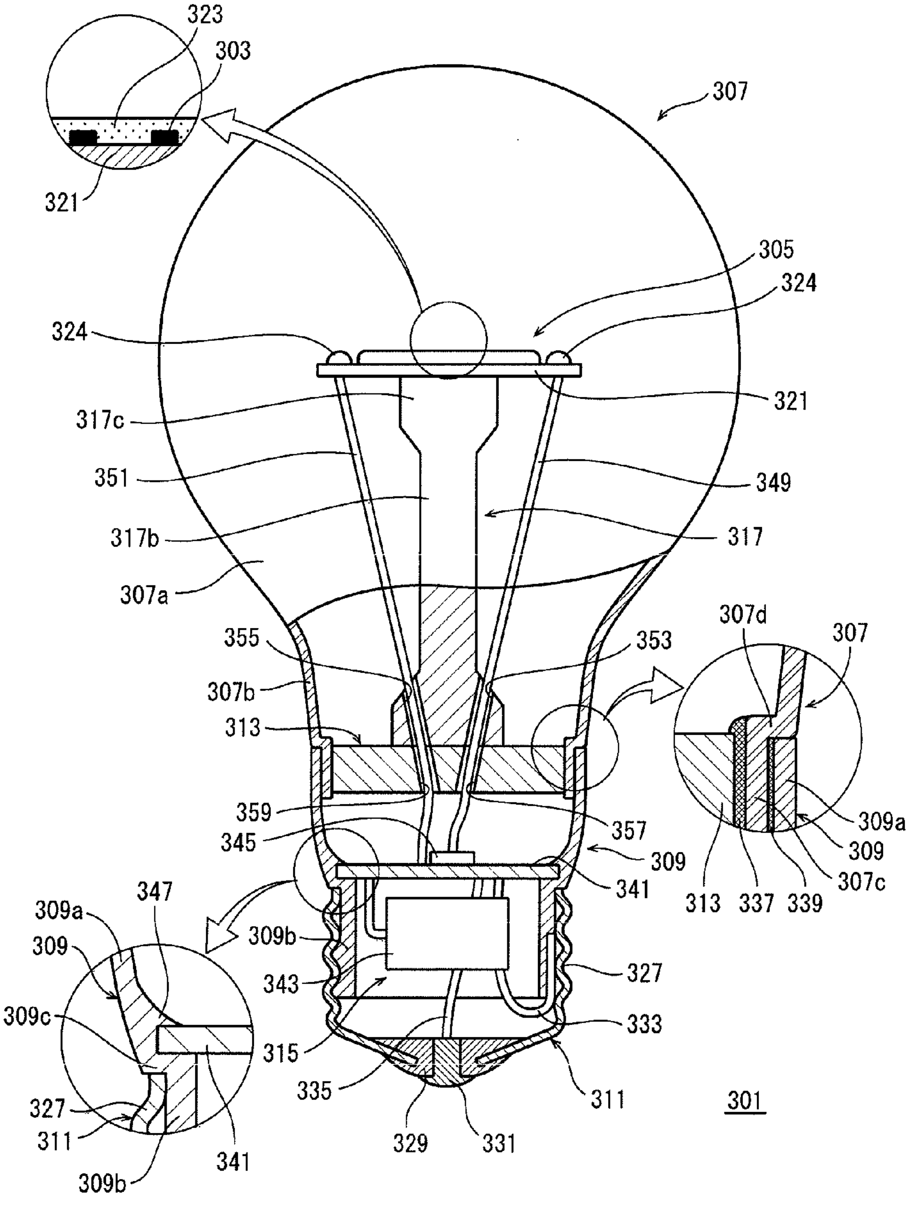
FIG. 9 is a partial cross-section along the front face of an LED lamp.

FIG. 8 is a perspective view of the LED lamp pertaining to Embodiment 4, while FIG. 9 is a partial cross-sectional view along the front of the LED lamp.

1. Overall Configuration

As shown in FIGS. 8 and 9, the LED lamp 301 has an LED module 305 that uses LEDs 303 as light sources arranged within the globe 307. A case 309 is mounted at an opening end of the globe 307. The case 309 is tubular. A base 311 is mounted at the other end (i.e., the lower end as shown in FIG. 8) of the case 309.

A base member 313 (corresponding to the mount for the present Embodiment) closes the other end of the case 309. A circuit unit 315 is held within the case 309. The base member 313 has an extended member 317 mounted thereon that extends within the globe 307 and has the LED module 305 mounted on the tip thereof.

2. Component Configuration (1) LED Module

The LED module 305 includes a mounting substrate 321 and a plurality of LEDs 303 mounted on the front face (i.e., the top face, oriented opposite the base 311) of the mounting substrate 321. In the present Embodiment, the LEDs 303 are LED elements. In addition to the aforementioned mounting substrate 321 and the LEDs 303, the LED module 305 includes sealant 323 that covers the LED 303.

Here, the mounting substrate 321 is configured from an optically transmissive material so as to not block light emitted backward by the LEDs 303. That is, the mounting substrate 321 is made from the optically transmissive material in order to allow light emitted by the LEDs 303 provided on the top face of the mounting substrate 321 toward the mounting substrate 321 itself to pass, as-is, through the mounting substrate 321 and reach the globe 307. The optically transmissive material is, for example, glass, aluminium oxide, or similar.

Here, the mounting substrate 321 is rectangular as seen in a plan view. The mounting substrate 321 is electrically connected (in parallel and/or in series) to the LEDs 303 and to the circuit unit 315 by a (non-diagrammed) wiring pattern. In consideration of the usage of light emitted backward by the LEDs 303, the wiring pattern is also beneficially formed from an optically transmissive material. This optically transmissive material may be indium-tin oxide (hereinafter, ITO) or similar.

As shown in the magnified portions of FIG. 9, the LEDs 303 are mounted on the top face of the mounting substrate 321. The quantity and arrangement of the LEDs 303 may be determined as appropriate, given requirements for brilliance and so on applied to the LED lamp 301. In the present Embodiment, the LEDs 303 are provided in plurality with spacing (e.g., at equal intervals) such that two straight rows are formed along the lengthwise direction of the rectangular mounting substrate 321.

The sealant 323 is mainly formed of an optically transmissive material. The sealant 323 serves to prevent air and water from reaching the LEDs 303. Here, the LEDs 303 are arranged in straight lines forming row units, and the LEDs 303 making up each row unit are covered.

In addition to preventing air and the like from entering, the sealant 323 also serves as a wavelength converter when there is a need to convert the light emitted by the LEDs 303 to a predetermined wavelength. The wavelength conversion is, for example, performed by a conversion material that is combined with the optically transmissive material and converts the wavelength of the light.

The optically transmissive material is, for example, a silicone resin. When wavelength conversion is called for, the conversion material may be, for example, fluorescent particles.

Here, the LEDs 303 produce blue light, while the conversion material is realised as fluorescent particles that convert the blue light into yellow light. Accordingly, the blue light emitted by the LEDs 303 is combined with the yellow light converted by the fluorescent particles to produce white light that is then emitted by the LED module 305 (i.e., the LED lamp 301).

The mounting substrate 321 has a through-hole formed in or near a portion connected to the wiring pattern by later-described leads 349 and 351, which have an electrically connected to the circuit unit 315. Another end of the leads 349 and 351, which accordingly pass through the through-hole, is connected to the wiring pattern by solder 324.

(2) Globe

The globe 307 is shaped similarly to an incandescent bulb (i.e., a glass bulb). Here, the globe 307 resembles a typical incandescent bulb (i.e., a filament-using light bulb), specifically an A-type bulb.

The globe 307 includes a spherical portion 307*a*, which is an empty sphere, and a cylindrical portion 307*b*. The cylindrical portion 307*b* has a diameter that gradually diminishes with increasing distance from the spherical portion 307*a*. Also, the cylindrical portion 307*b* has an opening at the end opposite the spherical portion 307*a*, which forms an opening end 307*c*.

The globe 307 is formed of an optically transmissive material. The optically transmissive material is a glass material or a resin material. In this example, the globe 307 is made from glass material.

(3) Case

The case 309 is shaped similarly to the portion of an incandescent bulb that is near the base. In Embodiment 4, the case 309 has a large-diameter portion 309*a* that substantially corresponds to the half of the case 309 near the globe, with respect to the central axis, a small-diameter portion 309*b* that likewise substantially corresponds to the half of the case 309 near the base, and a step portion 309*c* between the large-diameter portion 309*a* and the small-diameter portion 309*b*.

The large-diameter portion 309*a* of the case 309 is fixed to the outer circumferential surface of the opening end 307*c* of the globe 307 by adhesive 339.

The base 311 is mounted on the small-diameter portion 309*b* of the case 309. In Embodiment 4, the base 311 is an Edison screw, as described below. Thus, the outer circumference of the small-diameter portion 309*b* is a male screw that is screwed into the base 311. Accordingly, the base 311 and the case 309 are joined.

Also, the small-diameter portion 309*b* of the case 309 has a (non-diagrammed) groove formed therein that extends in parallel to the central axis of the case 309. The groove is for fixing a later-described lead 333 that connects the base 311 to the circuit unit 315 (i.e., the groove regulates displacement of the lead 333).

The case 309 is made from a resin material, for instance PBT. The resin material may also have glass fibres or similar combined therewith to adjust the thermo-conductivity of the case 309.

As described above, the case 309 has the globe 307 mounted on a top side, and has the base 311 on a bottom side, such that the shape taken as a whole resembles that of an incandescent bulb. The shape of the large-diameter portion 309*a* is curved to expand with increasing distance from the base 311.

The case 309 dissipates the heat produced by the circuit unit 315, which is held therein, upon being lit. This dissipation occurs by a thermal dissipation path from the case 309 to the atmosphere, through convective flow and radiation.

The case 309 has the above-described globe 307 mounted at the top open end thereof, and has the base 311 closing the bottom open end thereof, such that a space is present within. The circuit unit 315 is contained in this space. The method of fitting the circuit unit 315 is discussed in the section concerning the circuit unit 315.

(4) Base

The base 311 receives electric power from a socket of a lighting fixture when the LED lamp 301 is attached to the lighting fixture and is lit.

No particular limitation is intended regarding the type of base 311. In the present Embodiment, an Edison screw is used. The base 311 is made up of a shell portion 327, which is cylindrical with a helical outer wall, and an eyelet 331 mounted to the shell portion 327 through an insulating material 329.

The shell portion 327 and the eyelet 331 are respectively connected to the circuit unit 315 by leads 333 and 335. Here, lead 333 is fit into the groove of the case 309 and extends from within the small-diameter portion 309*b* of the case 309 through the bottom end opening to the outside, being covered by the shell portion 327. Accordingly, lead 333 is sandwiched between the outer circumference of the case 309 and the inner circumference of the shell portion 327, and is electrically connected to the base 311.

(5) Base Member

The base member 313 is inserted into the opening end 307*c* of the globe 307. The base member 313 has an outer face (i.e., circumferential surface) that corresponds to the inner face of the opening end 307*c* of the globe 307 when inserted as such into the globe 307. Here, the inner circumferential surface of the globe 307 corresponds to the outer circumferential surface of the base member 313, and the inner circumferential surface of the opening end 307*c* has a round cross-section. As such, the base member 313 is also a circular disc having a round cross-section.

The base member 313 is inserted into the opening end 307*c* of the globe 307 and joined by adhesive 337. The opening of the globe 307 is sealed by the base member 313 and is inserted into the large-diameter portion 309*a* of the case 309, where the components are joined by adhesive 339.

The base member 313 closes the opening of the globe 307 and also serves to propagate the heat produced when the LEDs 303 are lit from the extended member 317 to the globe 307.

As such, the base member 313 is made of a material that is beneficially thermo-conductive. Specifically, a metal or resin material is used. Also, adhesive 337 is at least as thermo-conductive as the base member 313, while adhesive 339 is no more thermo-conductive than the base member 313 or the case 309.

(6) Circuit Unit

The circuit unit 315 converts electric power received via the base 311 into power usable by the LEDs 303 of the LED module 305 and supplies the power to the LED module 305 (i.e., the LEDs 303). The circuit unit 315 includes a circuit substrate 341 and various electronic components 343 and 345 mounted on the circuit substrate 341.

The circuit substrate 341 is fixed within the case 309 using an interlocking structure. Specifically, the circumference of the reverse face (i.e., the face oriented toward the base 311) of the circuit substrate 341 comes into contact with the step portion 309*c* in the case 309, and the front face of the circuit substrate 341 interlocks with the interlocking part 347 on the inner face of the large-diameter portion 309*a*.

The interlocking part 347 is provided in plurality (e.g., as four parts) and with spacing (e.g., at equal intervals) along the circumferential direction. Each interlocking part 347 expands toward the central axis of the case 309 with increasing proximity to the step portion 309*c*. The distance between the interlocking part 347 and the step portion 309*c* corresponds to the thickness of the circuit substrate 341.

The circuit substrate 341 is mounted by inserting the circuit unit 315 from the large-diameter portion 309*a* of the case 309. Once the reverse face of the circuit substrate 341 reaches the interlocking part 347, the circuit substrate 341 is pressed further to pass through the interlocking part 347. Accordingly, the circuit substrate 341 interlocks with the interlocking part 347 and the circuit unit 315 is thereby mounted in the case 309.

The circuit unit 315 includes a rectifier circuit rectifying commercial electric power (i.e., AC power) received via the base 311, and a smoothing circuit smoothing the rectified DC power. The smoothed DC power is converted into a predetermined voltage by a step-up or a step-down circuit, as needed, for application to the LEDs 303.

Here, the rectifier circuit is a diode bridge 345, and the smoothing circuit is a condenser 343. The diode bridge 345 is mounted on the main surface of the circuit substrate 341 that is oriented toward the globe 307. The condenser 343 is mounted on the main surface of the circuit substrate 431 that faces the base 311 and is, as such, positioned within the base 311.

(7) Extended Member

The extended member 317 supports the LED module 305 at a central position within the globe 307. The extended member 317 is baculiform, having a top end that is joined to the LED module 305 and a bottom end affixed to the base member 313. That is, the extended member 317 extends from the base member 313 to the interior of the globe 307, and has the base member 313 provided thereon.

The top end of the extended member 317 and the LED module 305 are joined by an engaging structure, for instance. A protrusion 317*a* is formed on a top face of the extended member 317. Also, a hole 321*a* is formed at the approximate centre of the mounting substrate 321 of the LED module 305. The respective shapes of the protrusion 317*a* and the hole 321*a* are in correspondence. As such, the protrusion 317*a* on the top face of the extended member 317 and the hole 321*a* in the LED module 305 fit together to join the two components.

The bottom end of the extended member 317 and the base member 313 are joined by, for example, an adhesive structure. The bottom face of the extended member 317 is flat. The flat bottom face of the extended member 317 is fixed (i.e., joined) to the flat top face of the base member 313 by (non-diagrammed) adhesive.

The extended member 317 supports the LED module 305 jointly with the base member 313. The heat produced by the LEDs 303 when lit is propagated to the base member 313. This thermal propagation is achieved by using a highly thermo-conductive material.

The LED module 305 has the mounting substrate 321 made from the optically transmissive material, and as such, light can also be emitted backward from the LED module 305. As such, the extended member 317 is shaped to be quite baculiform in order to avoid obstructing light emitted backward from the LEDs 303 (i.e., from the LED module 305).

That is, the central area of the extended member 317 has a columnar portion 317*b* with a round cross-section. An upper area of the extended member 317 is formed as a flat portion 317*c* that is flattened with respect to a latitudinal direction of the rectangular mounting substrate 321 (i.e., such that the latitudinal dimension is smaller). A lower area of the extended member 317 forms a circular frustum portion 317*d*, which is shaped as a truncated cone that expands in diameter with increasing proximity to the base member 313. Accordingly, the light emitted backward by the LEDs 303 easily reaches the bottom end of the extended member 317 and is reflected to the outside.

The extended member 317 is made of an optically transmissive material (e.g., glass) in order to avoid obstructing the light emitted backward by the LED 303.

The extended member 317 has through-holes 353 and 355 formed therein for passing leads 349 and 351 that are electrically connected to the circuit unit 315 and the LED module 305, respectively. Also, the base member 313 has similar through-holes 357 and 359 for passing the leads 349 and 351.

A highly thermo-conductive material is beneficially used in order to effectively propagate the heat from the LED module 305 to the base member 313. Such a material may be a metal. The extended member 317 is, for example, made of aluminium, which also provides beneficial lightness. In such a case, the light from the LEDs 303 reaching the front face of the extended member 317 is easily reflected backward.

(Variations)

Although the present disclosure has been described above in terms of Embodiments 1 through 4 and variants thereof, no limitation is intended to the above-given Embodiments and variants.

For example, the LED lamp pertaining to Embodiments 1 through 4 and the variants thereof may be employed in part, in combination with the following variations and various adjustments thereto.

1. Joining of Case and Globe

In the Embodiments, the mount and the case are described as respectively joined to the inner circumferential face and the outer circumferential face of the globe. However, the joining may be implemented differently provided that more heat is propagated from the mount to the globe than from the mount to the case. Another approach, in which the mount and the case are both joined to the inner circumferential surface of the globe, is described in the present Variation.

Figure 10:
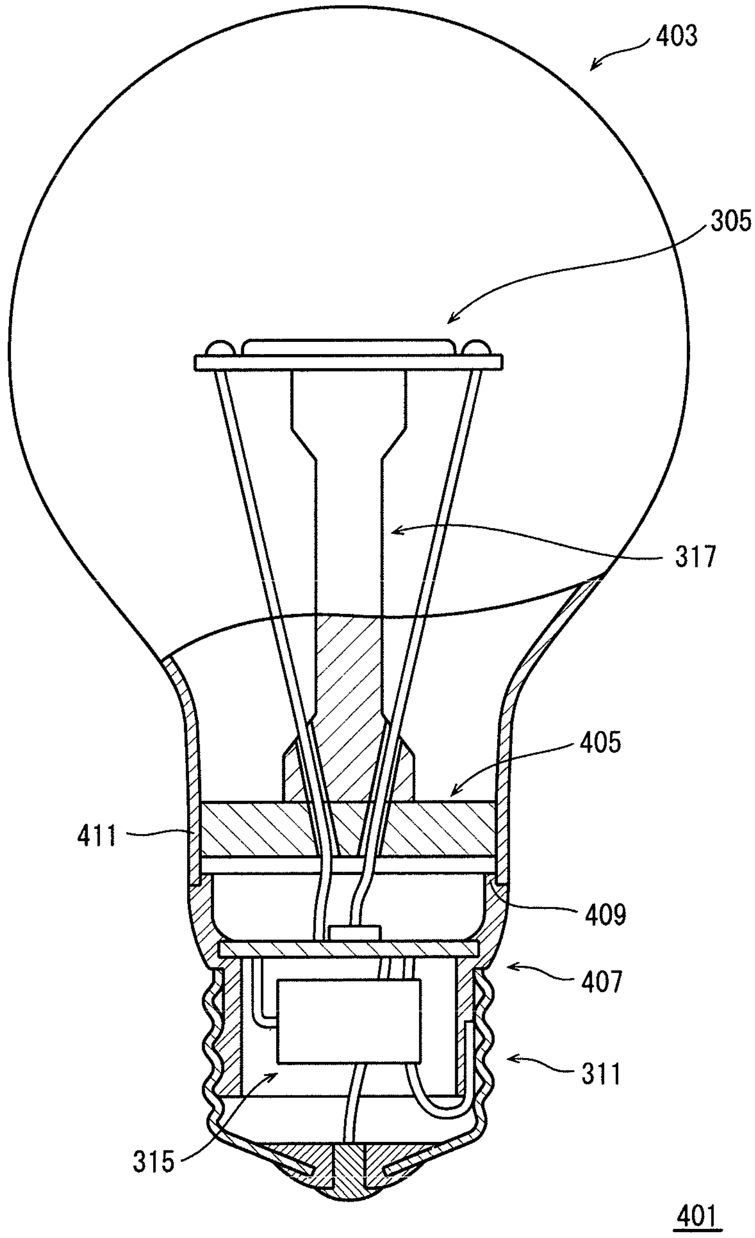
FIG. 10 illustrates a joining approach used in a Variation.

FIG. 10 illustrates the joining approach used in the present Variation.

An LED lamp 401 pertaining to the present Variation is configured similarly to the LED lamp 301 of Embodiment 4.

The LED lamp 401 has a globe 403 in which is located the LED module having the LEDs 303 serving as light sources (see the magnified portions of FIG. 9). A base member 405 is affixed to an opening end 411 of the globe 403. The case 407 is cylindrical, having the base 311 affixed to one end and the globe 403 to another end thereof. A circuit unit 315 is held within the case 407. The base member 405 has an extended member 317 that extends within the globe 403 and has the LED module 305 affixed to the tip thereof.

The LED module 305, the base 311, and the extended member 317 are configured identically to the corresponding components of Embodiment 3, and explanations thereof are thus omitted. Components identified by reference signs in FIG. 10 and not explained in the present Variation are configured identically to the corresponding components of Embodiment 4.

The LED lamp 401 pertaining to the present Variation has the base member 405, which is a circular disc, fitted closer to the apex of the globe 403 than to the bottom of the opening end 411 of the globe 403. Also, the case 407 is fitted below the base member 405, at some separation from the base member 405.

The mounting of the base member 405 in the globe 403 is achieved by fixing the outer circumferential surface of the base member 405 to the inner circumferential surface of the globe 403 using adhesive. This adhesive is beneficially at least as thermo-conductive as whichever of the base member 405 and the globe 403 is less thermo-conductive (i.e., has a thermo-conductive efficacy that is 0.9 to 1.1 times that of the less thermo-conductive component).

The globe 403 is affixed to the case 407 by inserting a tip 409 of the case 407, the tip 409 facing the globe 403, into the opening end 411 of the globe 403. Specifically, the outer circumferential surface of the tip 409 of the case 407 is fixed to the inner circumferential surface of the opening end 411 of the globe 403 by adhesive. The adhesive is beneficially no more thermo-conductive than the case 407 (i.e., has a thermo-conductive efficacy that is 0.9 to 1.1 times that of the case 407).

The tip 409 of the case 407 has a step formed therein, as though a piece of the outer circumference has been removed. The inner edge of the step is inserted into the globe 403 such that the step is in contact with the end face of the opening end 411 of the globe 403.

An outer circumferential end face of the opening end 411 of the globe 403 corresponds, in terms of diameter, and is nearly identical to an outer circumferential end face of the end 409 of the case 407.

2. Joining of Mount and Globe

In Embodiment 1, the opening end 31 of the globe 30 is not particularly processed to improve the propagation of heat from the mount 20. However, a propagation-improving process may also be applied.

The propagation-improving process may involve, for example, forming a metallic film on the inner circumferential face of the opening end of the globe and, an insert moulding method of using resin as the globe material, involving exposing a cylindrical metal member (e.g., a metal ring) on the inner circumferential face of the opening end of the globe so as to form the globe with the metal member.

Furthermore, thermo-conductivity can be improved by providing, on the inner face of the globe, a protrusion that protrudes toward the mount and the LED module, and the protrusion may be in contact with the top face of the mount or the LED module (i.e., may configured to increase the contact surface area). Contact with the top face of the mount may be ensured by reducing the size of the LED module mounted on the mount, by providing a clearing, on the LED module, corresponding to a planned contact position between the mount and the globe. When provided, this configuration serves to press on the LED module (i.e., serves in affixing components).

3. Joining of Mount (LED Module) and Case

In Embodiment 3, the mount and the case are described as being joined. However, Embodiment 3 also features a heat shield plate as a consideration toward reducing the thermal load on the electronic components of the circuit unit.

When improvements to LED luminous efficacy cause a reduction in the heat produced by the LED module, or when the thermal resistance of the electronic components in the circuit unit is improved, then the heat from the LED module may be intentionally propagated not only to the globe but also to the case.

That is, the heat produced by the LED module may be approximately equally distributed in propagation between the globe and the case. Specifically, the contact surface area between the mount and the case and the contact surface area between the globe and the mount may be equalised, or the contact surface area between the LED module and the case and between the mount (and/or the LED module) and the globe may be equalised, or the total contact surface area between the mount, the LED module, and the case and the contact surface area between the mount and the globe may be equalised.

4. Thermal Parameters

In the Embodiments, the globe is made of a glass material, the mount is made of a metal material, and the case is made of a resin material. That is, the mount is more thermo-conductive than the case. Accordingly, the propagation heat from the mount toward the case is constrained, while being encouraged toward the globe.

However, the mount and the case may also be joined to the globe such that the heat propagated from the mount to the globe is equal to or greater than the heat propagated from the mount to the case. In such circumstances, the material for the globe may be resin or some other material.

For example, the globe and the case may be made of the same material, the mount and the globe may be joined by a highly thermo-conductive adhesive, and the case and the globe may be joined by a less thermo-conductive adhesive. Alternatively, the globe may be made of a highly thermo-conductive material, and the case may be made of a less thermo-conductive material.

Constraining the propagation of heat from the mount to the case and thermally joining the case and the globe enables thermal parameters to be set such that the heat of the circuit unit is propagated from the case to the globe, when the thermal dissipation by the globe is plentiful.

5. LED Module (1) Light-Emitting Element

In the Embodiments, the semiconductor light-emitting element is an LED. However, the semiconductor light-emitting element may also be, for instance, a laser diode (hereinafter, LD) or an electroluminescence element (hereinafter, EL element).

Also, the LEDs are described as being mounted onto the mounting substrate as chips. However, the LEDs may also be mounted onto the mounting substrate on the surface (i.e., as surface-mounted devices, hereinafter SMDs), or as packages. Furthermore, the LEDs may include a combination of chips, SMDs, and packets.

(2) Mounting Substrate

In Embodiments 1 through 3, the mounting substrate is circular as seen in a plan view, and in Embodiment 4, is rectangular as seen in a plan view.

However, the mounting substrate may also be shaped differently, for instance being square, pentagonal, or some other polygon (including all regular polygons), or else may be oval, annular, and so on.

Also, the substrate is not limited to being singular. Two or more substrates may be provided. Furthermore, in Embodiment 4, the mounting substrate is described as having the LEDs 303 mounted on the front face thereof. However, the LEDs may also be mounted on the reverse face.

(3) Sealant

In Embodiments 1 through 3, LED groups each include one pair of the LEDs 12, and the sealant 13 singly covers each LED group. However, the sealant may also singly cover each individual LED, or may singly cover a group of three or more LEDs. Furthermore, the LED groups need not be formed from a fixed quantity of LEDs.

The LED groups may each include one of several fixed quantities of LEDs, each group being singly covered by sealant. Alternatively, the LED groups may each include one of several non-fixed quantities of LEDs, each group being singly covered by sealant. Also, all LEDs may be jointly covered by a single sealant.

(4) LED Arrangement

In Embodiment 1, the (group of) LEDs is disposed annularly. However, the arrangement of LEDs may also be triangular, quadrilateral, pentagonal, or some other polygonal shape, or else may be ovoid or polygonally annular.

In Embodiment 4, the LEDs are disposed in two rows. However, the LEDs may also be disposed, with reference to the plan view, in four rows forming a quadrilateral, in a curve forming an oval (including round shapes), or the like.

Also, the LEDs may be mounted with lower density at the centre of the mounting substrate (corresponding to the mount when the LEDs are directly mounted thereon as discussed below) than at the periphery of the outer circumference. Accordingly, the centre of the mount is prevented from reaching high temperatures. Furthermore, increasing the quantity of LEDs mounted at the periphery of the mounting substrate (i.e., decreasing the pitch of mounted LEDs) promotes optical scattering at the apex of the globe (i.e., on the side opposite the opening). Also, the centre of the mounting substrate may be made thick in order to prevent temperature increases at that location.

(5) Other

The LED module 10 is described as emitting white light by combining blue light produced by the LEDs 12 with the yellow light converted from the blue light by fluorescent particles. However, other configurations may also be used, such as a combination of semiconductor light-emitting elements producing ultra-violet light with fluorescent particles producing three colours (e.g., red, green, and blue) of light (i.e., through wavelength conversion).

Further still, the wavelength conversion material may be a semiconductor, metallic complex, organic dye, pigment, or similar having a property of absorbing light of a given wavelength and emitting light of a different wavelength.

6. Mount

In Embodiment 1, the mount 20 is a circular disc. However, the mount 20 may also be a disc having a concavity or a protrusion on a main surface thereof, may have a portion for mounting the LED module 10 that protrudes, that protruding portion being flat, or that is indented, that indented portion being flat.

Also, the fitting of the LED module 10 and the mount 20 may be performed using a method other than adhesive, such as a screw configuration or an engaging configuration, provided that there is a bond between the LED module and the mount.

The bond between the LED module and the mount is considered secure when the heat from the LED module when producing light (i.e., while lit) is effectively propagated to the mount and the temperature of the LED module (or the mounting substrate) remains lower than the temperature of the mount. In Embodiment 1, the LEDs are mounted on the mounting substrate, which is on the mount. However, the LEDs may also be mounted directly on the mount.

Figure 11:
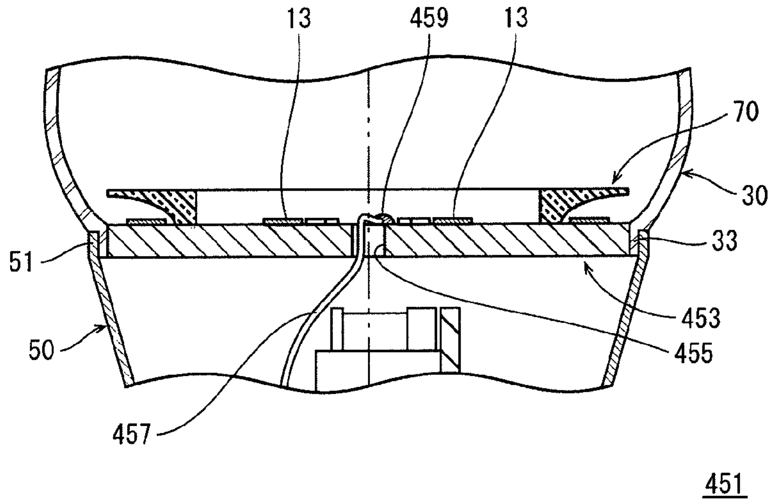
FIG. 11 is a magnified view of a Variation in which LEDs are directly mounted on a mount.

FIG. 11 is a magnified view of a Variation in which the LEDs are directly mounted on the mount.

An LED lamp 451 pertaining to the present Variation includes a mount 453 that closes an opening of the globe 30 by being fitted into the (flange 33 of the) opening end 31 of the globe 30, while the top end 51 of the case 50 is fitted into the flange 33 of the globe 30.

The mount 453 is made of an insulating material, such as resin. A pattern for electrically connecting the LEDs is formed on the top face thereof, and the plurality of LEDs are mounted on that top face. The mounting of the LEDs is otherwise identical to Embodiment 1, in terms of position and of having the sealant 13 cover pairs of LEDs.

A through-hole 455 is provided at the approximate centre of the mount 453. The through-hole 455 is used to pass electronic wiring 457 from the reverse side to the front side of the mount 453. The electronic wiring 457 is then fixed to the mount 453 using solder 459, thereby electrically connecting the pattern and the circuit unit 40. An optical scattering member 70 is fit onto the mount 453, much like Embodiment 1.

In comparison to Embodiment 1, the configuration of the present Variation does not require the mounting substrate, thereby enabling a decrease in cost. Also, no fixing means (e.g., screw) is required to fix the LED module onto the mount, which serves to simplify assembly and to further reduce costs.

7. Globe (1) Shape

In the Embodiments, the globe is shaped to resemble an incandescent bulb, or as part of a glass bulb. However, other shapes are also possible.

The globe need only be shaped to suit the application of the lamp in question (e.g., a general-purpose lamp, a reflector lamp, and so on). Also, when intended as a replacement for a conventional lamp, the globe may be shaped to resemble that conventional lamp.

Furthermore, the globe may shaped to correspond to a lighting fixture in which the LED lamp is mounted, such as, for a lighting fixture that has a reflector, having a shape that gradually increases in diameter with growing proximity to the opening of the reflector (i.e., a flask shape).

The shape of the globe 30 is not limited to resembling the shape of a type-A incandescent bulb. Other shapes are also possible.

(2) Materials

Provided that the material used for the globe is thermo-conductive, a material other than glass may be used, such as a resin material (e.g., polyethylene (hereinafter, PE, having a thermo-conductive efficacy of approximately 0.4 W/m·K), epoxy resin (bisphenol A, having a thermo-conductive efficacy of approximately 0.2 W/m·K) silicone (silicon rubber, having a thermo-conductive efficacy of approximately 0.15 W/m·K), or polystyrene foam (i.e., Styrofoam, having a thermo-conductive efficacy of approximately 0.05 W/m·K), a ceramic material, or similar. Given thermal dissipation concerns for the globe, using glass, ceramic, or a highly thermo-conductive resin is beneficial.

Also, a filler may be combined with the resin material in order to improve thermo-conductivity. The filler may be any of: carbon nanotubes (C, having a thermo-conductive efficacy of approximately 3000 W/m·K to 5500 W/m·K), diamond (C, having a thermo-conductive efficacy of approximately 1000 W/m·K to 2000 W/m·K) silver (Ag, having a thermo-conductive efficacy of approximately 420 W/m·K), copper (Cu, having a thermo-conductive efficacy of approximately 400 W/m·K), gold (Au, having a thermo-conductive efficacy of approximately 320 W/m·K) aluminium (Al, having a thermo-conductive efficacy of approximately 235 W/m·K), silicon (Si, having a thermo-conductive efficacy of approximately 170 W/m·K), brass (having a thermo-conductive efficacy of approximately 105 W/m·K) iron (Fe, having a thermo-conductive efficacy of approximately 85 W/m·K), platinum (Pt, having a thermo-conductive efficacy of approximately 70 W/m·K), stainless steel (having a thermo-conductive efficacy of approximately 16 W/m·K to 21 W/m·K), crystal ($SiO_2$, having a thermo-conductive efficacy of approximately 10 W/m·K), glass (having a thermo-conductive efficacy of approximately 1 W/m·K), ceramic (AlN (having a thermo-conductive efficacy of approximately 150 W/m·K), SiC (having a thermo-conductive efficacy of approximately 60 W/m·K), $Al_2O_3$ (having a thermo-conductive efficacy of approximately 30 W/m·K) $Si_3N_4$ (having a thermo-conductive efficacy of approximately 20 W/m·K)), or $ZrO_2$ (having a thermo-conductive efficacy of approximately 5 W/m·K)), and so on.

The term approximately is used above to indicate range of ±15%.

(3) Configuration

When the globe is made from glass material, resin material, ceramic material, or the like as described in the Embodiments, the configuration may use that material alone. However, for instance, the resin material may be used in a compound structure where a skeleton of metal material, glass material, ceramic material, or similar is buried within the resin material.

(4) Other

In Embodiment 1, the mount and the globe are joined by the outer circumferential surface of the mount being in contact with the inner circumferential surface of the flange in the globe. However, the end of the globe may branch off (i.e., bifurcate) to increase the contact surface area between the mount and the globe.

Figure 12:
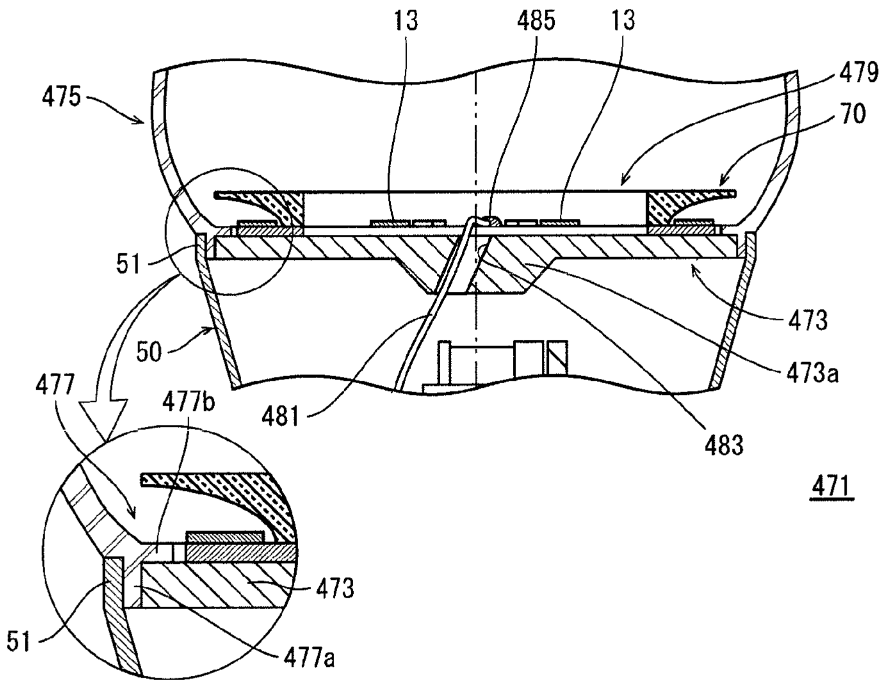
FIG. 12 illustrates the key components of a globe end in a Variation.

FIG. 12 illustrates the key components of the globe end in the present Variation.

An LED lamp 471 pertaining to the present Variation includes a mount 473 that closes an opening of a globe 475 by being fitted into the opening end 477 of the globe 475, while the top end 51 of the case 50 is fitted into the opening end 477 of the globe 475.

As shown in the magnified portion of FIG. 12, the opening end 477 of the globe 475 has a first extension 477*a* that extends downward, much like the flange 31 of Embodiment 1, and a second extension 477*b* that extends toward the centre of the globe 475.

The first extension 477*a* is in contact with the outer circumferential surface of the mount 473 while the second extension 477*b* is in contact with the top face of the mount 473. Accordingly, the contact surface area between the mount 473 and the globe 475 is increased, and more heat is propagated from the mount 473 from the globe 475.

Also, the mount 473 has the LEDs mounted thereon with greater density at the centre than the periphery, and has a thickened portion 473*a* at the centre of the lower face that protrudes downward. Accordingly, the centre of the mount 473 is prone to heating due to the light produce by the LEDs, but the thickened portion 473*a* increases the thermal capacity and therefore improves the dissipation of heat to the mount 473.

The LED module 479 has a smaller outer radius than the LED module 10 of Embodiment 1, due to the presence of the second extension 477*b* of the globe 475. The LED module 479 and the electronic wiring 481 from the circuit unit 40 are connected by passing an end of the electronic wiring 481 through a through-hole 483 provided in the thickened portion 473*a* of the mount 473 and fixing the end to the LED module 479 with solder 485. The thickened portion may also protrude upward, or may have LEDs mounted on the protruding area thereof.

8. Case

In Embodiment 1, the case is made of resin material. Given thermo-conductivity considerations, a filler material may be added to the resin material, as explained above in the section pertaining to the globe. The case may also be made of another material. Such material may include a metal material, a ceramic material, and so on.

When a metal material is used, some insulation from the base must be provided. The insulation from the base may be, for example, an insulating film applied to the small-diameter portion of the case, an insulating process applied to the small-diameter portion, or making the portion of the case nearer to the globe from the metal material while making the portion of the case nearer to the base from a resin material (i.e., using two or more joined members).

In the above-described Embodiments and Variations, no particular limitation is given regarding the surface of the case. For instance, a heat-dissipating fin may be provided, or some process may be applied to improve the irradiative ratio thereof.

9. Combination of Globe and Case

No particular attention is given in the Embodiments to the combination of materials in the globe and case. However, given thermo-conductivity (i.e., thermal dissipation) concerns, the following combinations are beneficial.

When the case is made of resin, then the globe is beneficially made of a resin material that is more thermo-conductive than the resin used for the case, or of glass or a ceramic material. The aforementioned more thermo-conductive resin material may be a material that is inherently highly thermo-conductive, or may be a resin material that is less thermo-conductive than the case but is combined with a filler material such as those explained above in the section pertaining to the globe.

When the case is made of a metal material, the globe may be made of carbon nanotubes. Specifically, a resin globe or a glass globe combined with carbon nanotubes improves the thermal dissipation of the globe.

Furthermore, the globe may be configured from a resin material in a structure where a skeleton of metal material is buried within the resin material, such as that discussed in portion (3) of the section concerning the globe. In such a situation, the case is beneficially made from resin material.

10. Optical Scattering Member

In Embodiment 1, the optical scattering member 70 and the LED module 10 are described as being joined by adhesive.

However, other methods may also be used. These other methods include fastening with screws, using an engaging configuration, and combinations of these and adhesive-using methods.

Also, the optical scattering member 70 may be in contact with the mount 20 rather than the LED module 10 mounted on the mount 20.

11. Base

In Embodiment 1, an Edison screw is used as the base. However, another type of base, such as a pin base (specifically a GY, GX, or other G-type base) may also be used.

Also, in the Embodiments and Variations, the base is fitted (joined) to the case by being screwed into a screw portion of the case using the female screw of the shell portion. However, other joining methods are also possible. The other methods include joining by adhesive, joining by crimping, joining by pressurising, or joining by a combination of two or more methods.

12. Lighting Device

In the Embodiments, the explanations particularly focus on the LED lamp. However, the present disclosure is also applicable to a lighting device using the above-described LED lamp.

The LED lamp described as background art has an enlarged case in order to use the case as a heat dissipating member. In such a situation, the arrangement and positioning of LEDs is farther from the base than the filament of an incandescent bulb. That is, the overall placement and positioning (i.e., distance from the base) of the LEDs in the LED lamp is different from the overall positioning of the filament in an incandescent bulb.

Using such an LED lamp in a lighting fixture intended for an incandescent bulb and having a reflector, such as a down light, may be problematic in that the surface of the reflector subject to lighting produces an annular shadow. That is, the differences in light source relative to the conventional incandescent bulb may cause problems in terms of flux distribution or the like.

The present Variation describes a lighting fixture (for a down light) using an LED lamp 1 pertaining to Embodiment 4.

Figure 13:
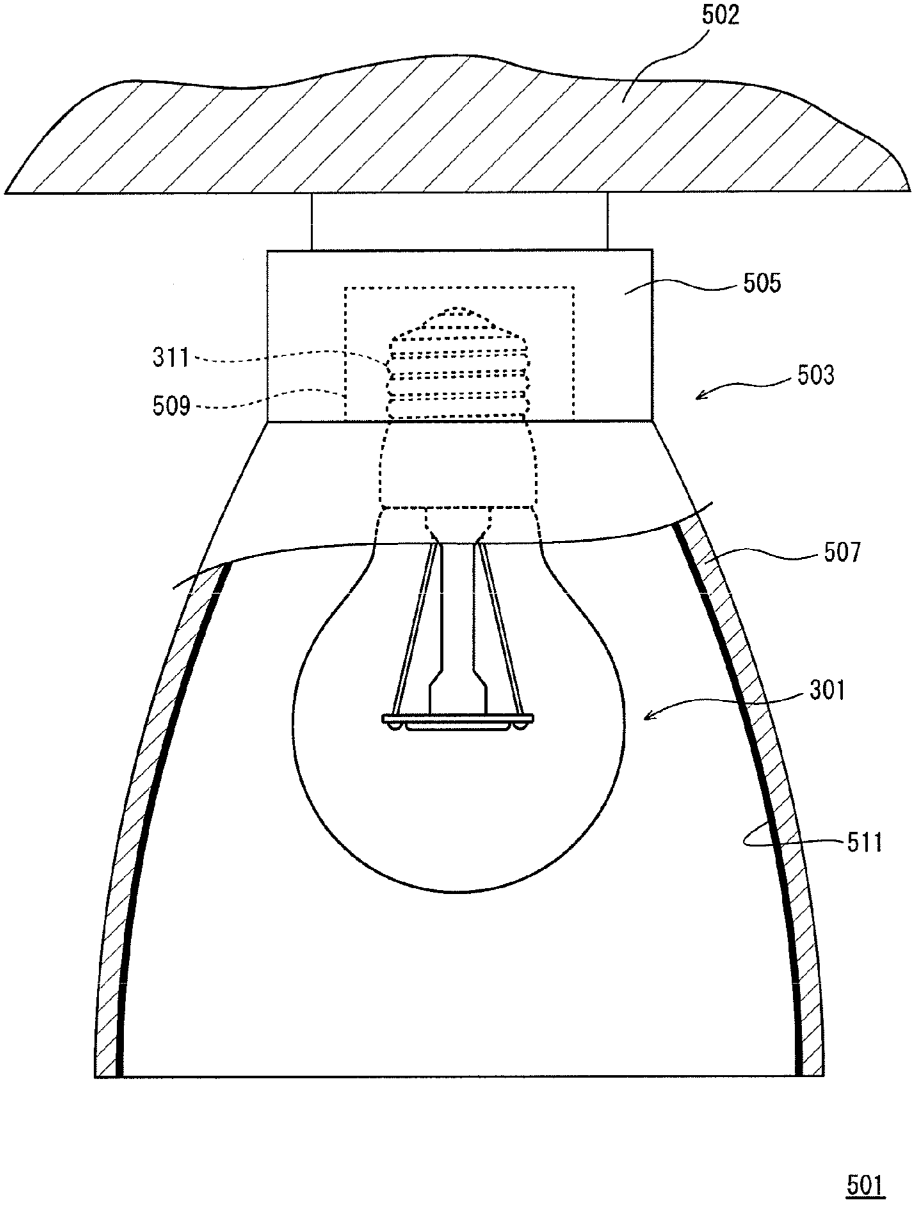
FIG. 13 illustrates a lighting device pertaining to a Variation.

FIG. 13 is a schematic diagram of an lighting fixture pertaining to the disclosure.

A lighting device 501 is, for example, mounted in a ceiling 502.

As shown in FIG. 13, the lighting device 501 includes an LED lamp (e.g., the LED lamp 301 described in Embodiment 4) and a lighting fixture 503 that lights and extinguishes the LED lamp 301.

The lighting fixture 503 includes, for example, a fixture body 505 that is fitted into the ceiling 502, and a cover 507 that is fit onto the fixture body 505 and covers the LED lamp 301. The cover 507 is an open-face type, having a reflective film 511 provided on an inner surface in order to reflect light emitted by the LED lamp 301 in a particular direction (e.g., downward in this example).

The fixture body 505 has a socket 509 into which the base 311 of the LED lamp 301 is fitted (i.e., screwed). Electric power is supplied to the LED lamp 301 via the socket 509.

In the present Variation, the LEDs 303 of the LED lamp 301 (i.e., the LED module 305) mounted in the lighting fixture 503 are arranged and positioned near the mounting position of the filament in an incandescent bulb. As such, the light-emitting centre of the LED lamp 301 is close to the light-emitting centre of an incandescent bulb.

As such, when the LED lamp 301 is fitted into in a lighting fixture intended for an incandescent bulb, the light-emitting centre of the lamp is near the desired position, thereby avoiding any problem posed by an annular shadow being produced by the illuminated surface.

Here, the lighting fixture may be, for example, not provided with the open-face cover 507 but rather with a closed-face cover, or may be oriented sideways (i.e., such that the central axis of the lamp is oriented horizontally) or obliquely ((i.e., such that the central axis of the lamp is oriented diagonally) and lit within the lighting fixture.

Also, while the lighting device is described as having a lighting fixture that is directly mounted on a ceiling or wall, alternatives include having the lighting fixture be embedded in the ceiling or wall, or having the lighting fixture hang from the ceiling via an electric cable.

Furthermore, the lighting fixture is described as lighting one LED lamp mounted therein. However, the lighting fixture may also light a plurality of, for example, three LED lamps mounted therein.

INDUSTRIAL APPLICABILITY

The present disclosure is widely applicable to general lighting.

REFERENCE SIGNS LIST

1 LED lamp
10 LED module
20 Mount
30 Globe
40 Circuit unit
50 Case
60 Base

The invention claimed is:

1. A lamp having an envelope that includes a globe and a case, an interior space of the envelope being divided in two by a mount closing an opening of the globe, the lamp containing, in a globe side of the interior space, a semiconductor light-emitting element and, in a case side of the interior space, a circuit unit for causing the semiconductor light-emitting element to emit light, wherein the mount is a circular disc having a side face that is at least partially joined to the globe by a first adhesive, an opening end of the globe is connected to the case by a second adhesive, the semiconductor light-emitting element is thermally connected to the mount and spatially separated from the envelope, the mount and an inner circumferential surface of the globe share a first surface contact region, and the mount and the case share a second surface contact region, wherein at the first surface contact region a part of the mount and the inner circumferential surface of the globe are joined by the first adhesive, and at the second surface contact region a part of the mount, the case and an outer circumferential surface of the globe are joined by the second adhesive.

2. The lamp of claim 1, wherein the globe is more thermo-conductive than the case.

3. The lamp of claim 1, wherein the case is fitted to an outside surface of an opening end of the globe.

4. The lamp of claim 1, wherein the first adhesive is more thermo-conductive than the case.

5. The lamp of claim 1, wherein the second adhesive is less thermo-conductive than the case.

6. The lamp of claim 1, wherein a heat shield plate is disposed between the mount and the circuit unit.

7. A lighting device comprising a lamp and a lighting fixture for mounting and lighting the lamp, wherein the lamp is the lamp of claim 1.

8. The lamp of claim 2, wherein the case is fitted to an outside surface of an opening end of the globe.

9. The lamp of claim 8, wherein the first adhesive is more thermo-conductive than the case.

10. The lamp of claim 9, wherein the second adhesive is less thermo-conductive than the case.

11. The lamp of claim 10, wherein a heat shield plate is disposed between the mount and the circuit unit.

12. The lamp of claim 1, wherein the first surface contact region is larger than the second surface contact region between the mount and the case.

13. The lamp of claim 1, wherein the first surface contact region and the second surface contact region do not overlap.

14. The lamp of claim 1, wherein the first surface contact region and the second surface contact region are not coplanar.

* * * * *